United States Patent
Cabrera et al.

(10) Patent No.: US 10,021,143 B2
(45) Date of Patent: *Jul. 10, 2018

(54) METHOD AND APPARATUS FOR MULTI-TENANCY SECRETS MANAGEMENT IN MULTIPLE DATA SECURITY JURISDICTION ZONES

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/014,900

(22) Filed: Feb. 3, 2016

(65) Prior Publication Data

US 2016/0156671 A1 Jun. 2, 2016

Related U.S. Application Data

(63) Continuation of application No. 14/265,930, filed on Apr. 30, 2014, now Pat. No. 9,282,122, which is a
(Continued)

(51) Int. Cl.
*G06F 17/00* (2006.01)
*H04L 29/06* (2006.01)

(52) U.S. Cl.
CPC ........ *H04L 63/205* (2013.01); *H04L 63/0428* (2013.01); *H04L 63/062* (2013.01);
(Continued)

(58) Field of Classification Search
CPC ..... H04L 63/205; H04L 63/10; H04L 63/107; H04L 63/062; H04L 63/0428; H04L 63/105; H04L 63/20
See application file for complete search history.

(56) References Cited

U.S. PATENT DOCUMENTS 5,003,596 A 3/1991 Wood
6,157,723 A 12/2000 Schultz
(Continued)

FOREIGN PATENT DOCUMENTS

EP 0906677 1/1998
EP 1501256 1/2005
(Continued)

OTHER PUBLICATIONS

Reddy, V. Krishna et al., "Security Architecture of Cloud Computing," International Journal of Engineering Science and Technology, Sep. 2011, pp. 7149-7155, vol. 3 Issue 9.
(Continued)

*Primary Examiner* — Trong Nguyen
(74) *Attorney, Agent, or Firm* — Hawley Troxell Ennis & Hawley LLP; Philip McKay

(57) ABSTRACT

A service provider computing environment includes a service provider computing device, which receives tenant secrets policies from tenants. The tenants are tenants of multi-tenant assets of a service provider. One or more data security zones in which the multi-tenant assets are located are identified. A service provider secrets policy includes data security jurisdiction zone secrets policy data for the one or more data security jurisdiction zones. The data security jurisdiction zone secrets policy data is analyzed to determine allowed secrets data with respect to each of the identified data security jurisdiction zones. The service provider computing environment determines of the tenant secrets policies satisfy the requirements of the service provider secrets policy. If the tenant secrets policies satisfy the requirements of the service provider secrets policy, the service provider computing environment allows the tenant secrets policies to be applied to tenant data or information in the multi-tenant assets.

35 Claims, 5 Drawing Sheets

Related U.S. Application Data continuation of application No. 14/073,110, filed on Nov. 6, 2013, now Pat. No. 9,467,477.

(52) U.S. Cl.
CPC ............ *H04L 63/10* (2013.01); *H04L 63/105* (2013.01); *H04L 63/107* (2013.01); *H04L 63/20* (2013.01)

(56) References Cited

U.S. PATENT DOCUMENTS

| | | |
|---|---|---|
| 6,324,648 B1 | 11/2001 | Grantges, Jr. |
| 6,889,210 B1 | 5/2005 | Vainstein |
| 6,981,041 B2 | 12/2005 | Araujo et al. |
| 6,996,716 B1 | 2/2006 | Hsu |
| 7,178,033 B1 | 2/2007 | Garcia |
| 7,336,790 B1 | 2/2008 | Caronni et al. |
| 7,360,075 B2 | 4/2008 | VanHeyningen et al. |
| 7,380,120 B1 | 5/2008 | Garcia |
| 7,434,045 B1 | 10/2008 | Enderwick et al. |
| 7,546,629 B2 | 6/2009 | Albert et al. |
| 7,568,235 B2 | 7/2009 | Bird et al. |
| 7,715,565 B2 | 5/2010 | Kimmel et al. |
| 7,739,501 B2 | 6/2010 | Kimmel et al. |
| 7,890,530 B2 | 2/2011 | Bilger et al. |
| 7,983,423 B1 | 7/2011 | Agarwal et al. |
| 7,984,025 B2 | 7/2011 | Valfridsson et al. |
| 8,095,960 B2 | 1/2012 | Boogert et al. |
| 8,316,237 B1 | 11/2012 | Felsher et al. |
| 8,352,999 B1* | 1/2013 | Zhan ................... H04L 63/104 713/165 |
| 8,498,941 B2 | 7/2013 | Felsher |
| 8,560,857 B2 | 10/2013 | Munetoh et al. |
| 8,656,189 B2 | 2/2014 | Orsini et al. |
| 8,700,898 B1 | 4/2014 | Korthny et al. |
| 8,700,906 B2 | 4/2014 | Kamara et al. |
| 8,826,013 B1 | 9/2014 | Kodukula et al. |
| 8,880,882 B2 | 11/2014 | Kulkarni et al. |
| 2002/0023065 A1 | 2/2002 | Frelechoux et al. |
| 2004/0210591 A1 | 10/2004 | Hirschfeld et al. |
| 2005/0138110 A1 | 6/2005 | Redlich et al. |
| 2006/0062238 A1 | 3/2006 | Mahendran et al. |
| 2006/0215839 A1 | 9/2006 | Augenstein et al. |
| 2006/0291664 A1 | 12/2006 | Suarez et al. |
| 2007/0156781 A1 | 7/2007 | Kapoor et al. |
| 2007/0195960 A1 | 8/2007 | Golman et al. |
| 2007/0276931 A1 | 11/2007 | Mahdavi et al. |
| 2008/0013569 A1 | 1/2008 | Boren |
| 2008/0072309 A1 | 3/2008 | Kleinsteiber et al. |
| 2008/0083036 A1 | 4/2008 | Ozzie et al. |
| 2008/0098392 A1 | 4/2008 | Wipfel et al. |
| 2008/0109491 A1 | 5/2008 | Gupta |
| 2008/0155649 A1 | 6/2008 | Maler et al. |
| 2008/0319909 A1 | 12/2008 | Perkins et al. |
| 2009/0092252 A1 | 4/2009 | Noll et al. |
| 2009/0103724 A1 | 4/2009 | Tamai |
| 2009/0204631 A1 | 8/2009 | Pomroy et al. |
| 2009/0287837 A1 | 11/2009 | Felsher |
| 2009/0319772 A1 | 12/2009 | Singh et al. |
| 2010/0082991 A1 | 4/2010 | Baldwin et al. |
| 2010/0146600 A1 | 6/2010 | Eldar et al. |
| 2010/0189251 A1 | 7/2010 | Curren |
| 2011/0004752 A1 | 1/2011 | Shukla |
| 2011/0022642 A1 | 1/2011 | deMilo et al. |
| 2011/0022812 A1 | 1/2011 | van der Linden et al. |
| 2011/0093707 A1 | 4/2011 | Green et al. |
| 2011/0113236 A1 | 5/2011 | Chenard et al. |
| 2011/0158406 A1 | 6/2011 | Marcia et al. |
| 2011/0188651 A1 | 8/2011 | Iswandhi et al. |
| 2011/0191595 A1 | 8/2011 | Damian et al. |
| 2011/0219035 A1 | 9/2011 | Korsunsky et al. |
| 2011/0277027 A1 | 11/2011 | Hayton et al. |
| 2012/0096281 A1 | 4/2012 | Eszenyi et al. |
| 2012/0131189 A1 | 5/2012 | Smart et al. |
| 2012/0185913 A1 | 7/2012 | Martinez et al. |
| 2012/0204032 A1 | 8/2012 | Wilkins et al. |
| 2012/0303776 A1 | 11/2012 | Ferris |
| 2012/0311564 A1 | 12/2012 | Khalid |
| 2013/0019284 A1 | 1/2013 | Pacyga et al. |
| 2013/0060825 A1 | 3/2013 | Farcasiu et al. |
| 2013/0097706 A1 | 4/2013 | Titonis et al. |
| 2013/0104213 A1 | 4/2013 | Nandakumar |
| 2013/0125247 A1 | 5/2013 | Sprague et al. |
| 2013/0185784 A1 | 7/2013 | Tamura |
| 2013/0204849 A1 | 8/2013 | Chacko |
| 2013/0219456 A1 | 8/2013 | Sharma et al. |
| 2013/0247144 A1 | 9/2013 | Marshall et al. |
| 2013/0254539 A1 | 9/2013 | Auradkar et al. |
| 2013/0346558 A1 | 12/2013 | Khalidi et al. |
| 2014/0007178 A1* | 1/2014 | Gillum ................. G06F 21/00 726/1 |
| 2014/0007239 A1 | 1/2014 | Sharpe et al. |
| 2014/0026179 A1 | 1/2014 | Devarajan et al. |
| 2014/0068732 A1* | 3/2014 | Hinton ................. G06F 21/41 726/6 |
| 2014/0074637 A1 | 3/2014 | Hammad |
| 2014/0075499 A1* | 3/2014 | Arun .................. H04L 41/5041 726/1 |
| 2014/0165134 A1 | 6/2014 | Goldschlag et al. |
| 2014/0244585 A1 | 8/2014 | Sivasubramanian et al. |
| 2014/0282840 A1 | 9/2014 | Guinan |
| 2014/0283010 A1* | 9/2014 | Rutkowski ............ G06F 21/31 726/18 |
| 2014/0330869 A1 | 11/2014 | Factor et al. |
| 2015/0106620 A1 | 4/2015 | Cabrera et al. |
| 2015/0106869 A1 | 4/2015 | Cabrera et al. |
| 2015/0128204 A1 | 5/2015 | Lietz et al. |
| 2015/0128207 A1 | 5/2015 | Cabrera et al. |
| 2015/0263859 A1 | 9/2015 | Lietz et al. |
| 2015/0310221 A1 | 10/2015 | Lietz et al. |
| 2015/0319192 A1 | 11/2015 | Cabrera et al. |

FOREIGN PATENT DOCUMENTS

| | | |
|---|---|---|
| EP | 2469753 | 6/2012 |
| EP | 2645673 | 10/2013 |
| GB | 2477682 | 11/2009 |
| GB | 2524632 | 1/2015 |
| WO | WO 2010/144735 | 12/2010 |
| WO | WO 2013/144497 | 10/2013 |

OTHER PUBLICATIONS

Weaver et al., "Method and System for Automatically Managing Secret Application and Maintenance," U.S. Appl. No. 14/069,921, Nov. 1, 2013.

Tokuyoshi, "Encryption: Getting a Grip on Key Rotation", Apr. 23, 2009, pp. 1-3. Retrieved from the internet. <http://www.cio.com/article/2428777/security0/encryption--getting-a-grip-on-key-rotation.html>.

Zao, et al.; "Domain Based Internet Security Policy Management;" DARPA Information Survivability Conference and Exposition, 2000 Proceedings; Jan. 25-27, 2000; IEEE.

* cited by examiner

METHOD AND APPARATUS FOR MULTI-TENANCY SECRETS MANAGEMENT IN MULTIPLE DATA SECURITY JURISDICTION ZONES

RELATED APPLICATIONS

This application is a continuation of Cabrera, et al., U.S. patent application Ser. No. 14/265,930 (INTU148035), filed on Apr. 30, 2014, entitled "METHOD AND APPARATUS FOR MULTI-TENANCY SECRETS MANAGEMENT," which is herein incorporated by reference in its entirety as if it were fully set forth herein. This application is also a continuation of Cabrera, et al., U.S. patent application Ser. No. 14/073,110 (INTU147857), filed on Nov. 6, 2013, entitled METHOD AND SYSTEM FOR AUTOMATICALLY MANAGING SECRETS IN MULTIPLE DATA SECURITY JURISDICTION ZONES," which is herein incorporated by reference in its entirety as if it were fully set forth herein.

BACKGROUND

A service provider of computing systems or computing environments or computing system assets can allocate portions of a computing system asset to multiple tenants. This type of resource sharing is called multi-tenant or multi-tenancy sharing. By allocating portions of the computing system asset to multiple tenants to establish multi-tenant assets, the service provider can allow the tenants to share the financial burden associated with maintaining computing environments or services while handling much of the logistical burdens associated with maintaining the computing environments.

To maintain secure multi-tenant assets or multi-tenant computing environments, the service provider can set forth data security rules or policies that must be adhered to by the tenants, for example, as part of a service agreement. However, the service provider's data security rules or policies may differ from the data security rules or policies of the tenants.

Furthermore, as various forms of distributed computing, such as cloud computing, have come to dominate the computing landscape, modern computing has become a global endeavor. One difficulty encountered when computing on a global scale is the fact that different geographic and/or political regions have different rules and regulations, i.e., data security policies, dictating the various types of secrets, security protocols, and security levels, such as encryption levels and keys, which can be used to protect data within these different geographic and/or political regions.

As a result, the data security policy of a given geographic and/or political region can dictate what secrets can be used to protect data in that geographic and/or political region, e.g., what level of encryption can be used on data within, or data originating from, the geographic and/or political region; what secrets can be sent to that geographic and/or political region, e.g., what encryption keys can be sent to the geographic and/or political region; and what secrets can be applied to data being transferred to the geographic and/or political region, e.g., what type of encryption can be used to encrypt data being sent to the geographic and/or political region As a specific illustrative example, the government of China allows only relatively low levels of encryption to be applied to data within China, and/or to be used to protect data that is to be transferred to China. In contrast, many European countries allow for a higher level of encryption to be applied to data within, and/or to be used to protect data that is to be transferred to, their territories. Consequently, an application, service, or system, desiring to encrypt data within China, or transfer data to China, must ensure that the level of encryption used to encrypt data within China, and/or the level of encryption applied to data to be transferred to China, and/or the encryption keys sent to China, conform with Chinese data security policy, while the same application, service, or system desiring to encrypt data within the Germany, or transfer data to Germany, must ensure that the level of encryption used to encrypt data within Germany, and/or the level of encryption applied to data to be transferred to Germany, and/or the encryption keys sent to Germany, conform with German data security policy.

Given that in the modern global computing environment it is often the case that a single application, service, or system is offered, interacts with, and often transfers data between, multiple geographic and/or political regions having different data security policies, ensuring that the data security policies of all the geographic and/or political regions associated with a given application, service, or system can be a daunting, if not overwhelming, task.

This situation, in and of itself, presents a level of complication that often interferes with the efficient processing and transfer of data required in modern computing environments, such as a cloud computing environment. However, the situation is further complicated and aggravated by the fact that there often exist different data security zones, with distinct and different data security policy requirements, within a given geographic or political region, and often within the same computing environment.

As an example, an application or service implemented in a cloud computing environment may, in some cases, be offered and used in different data security zones within the same cloud computing environment or network, and, in some situations, by the same user. In this case, just as in the case of two different geographic or political regions, it must be confirmed that the data security policies of all data security zones are known/understood and met.

As used herein, a given geographic zone, political zone, data security zone, multi-tenant asset, and/or computing environment, having its own associated data security policy is referred to as a data security jurisdiction zone. Consequently, as used herein, the term data security jurisdiction zone refers to both geographic and political zones as well as virtual data security zones within various computing environments.

As used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as secrets policy with respect to the data security jurisdiction zone.

It follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

Given the situation described above, significant amounts of time and energy are currently devoted to ensuring that the data security policies associated with various data security jurisdiction zones are met before secrets and/or secrets protected data are transferred to the data security jurisdiction zones. As noted, this often significantly interferes with the efficient and effective operation of various, and numerous, computing environments.

What is needed is a method and system that allows for the management of tenant secrets policies in a multi-tenant computing environment associated with one or more data security jurisdiction zones to ensure that only allowed secrets data are provided to each data security jurisdiction zone.

SUMMARY

In accordance with one embodiment, a method and system for managing secrets of tenants in a multi-tenant computing environment includes identifying one or more data security jurisdiction zones containing one or more multi-tenant assets to which secrets policies of tenants may be applied; maintaining a service provider secrets policy, wherein the service provider secrets policy data includes data indicating allowed secrets data for the identified one or more data security jurisdiction zones; receiving a request to apply a tenant secrets policy to the multi-tenant computing environment; comparing the tenant secrets policy to the service provider secrets policy; and authorizing the application of the tenant secrets policy to the multi-tenant computing environment if the tenant secrets policy satisfies the requirements of the service provider secrets policy. In one or more embodiments, secrets request data is received, the secrets request data representing a request that secrets data be transferred to a resource. In one embodiment, a determination of the data security jurisdiction zone associated with the resource is automatically made and security policy data associated with the determined data security jurisdiction zone of the resource is automatically retrieved.

In one embodiment, the data security policy data for the data security jurisdiction zone of the resource is automatically analyzed to determine allowed secrets data with respect to the data security jurisdiction zone of the resource and the determined allowed secrets data is obtained. In one embodiment, the allowed secrets data is then automatically provided to the resource.

In accordance with various embodiments, security jurisdiction zones to which secrets data may be transferred are identified. In one embodiment, data security policy data for the identified data security jurisdiction zones is obtained including data indicating respective allowed secrets data for the respective data security jurisdiction zones.

In one embodiment, for each identified data security jurisdiction zone, the data security policy data for the data security jurisdiction zone is automatically analyzed to determine allowed secrets data of the data security jurisdiction zone. In one embodiment, for each identified data security jurisdiction zone, allowed secrets data of the data security jurisdiction zone is automatically obtained.

In one embodiment, for each identified data security jurisdiction zone, the allowed secrets data for the data security jurisdiction zone is then automatically pre-deployed to an allowed secrets data store associated with the data security jurisdiction zone to await a secrets data request.

As used herein, an information secrets policy, data security policy, or secrets policy may interchangeably be referred to as an information security policy or a security policy.

In one embodiment, a service provider computing system receives secrets from tenants and maintains logs of the use, copying, deletion, receipt, transfer, and transmission of the tenants' secrets. In one embodiment, the service provider computing system provides the logs to each of the tenants for each tenants' secrets.

In one embodiment, the service provider computing system maintains a cross-tenant secrets policy which includes rules that are associated with sharing one tenant's secrets with another tenant to support multi-tenant operations of multi-tenant assets, such as shared applications, shared servers, shared virtual machines, shared memory devices, or the like.

In one embodiment, the service provider computing system applies authorized tenant secrets policies to the multi-tenant assets. In other embodiments, a tenant computing system applies authorized tenant secrets policies to multi-tenant assets.

Figure 1:
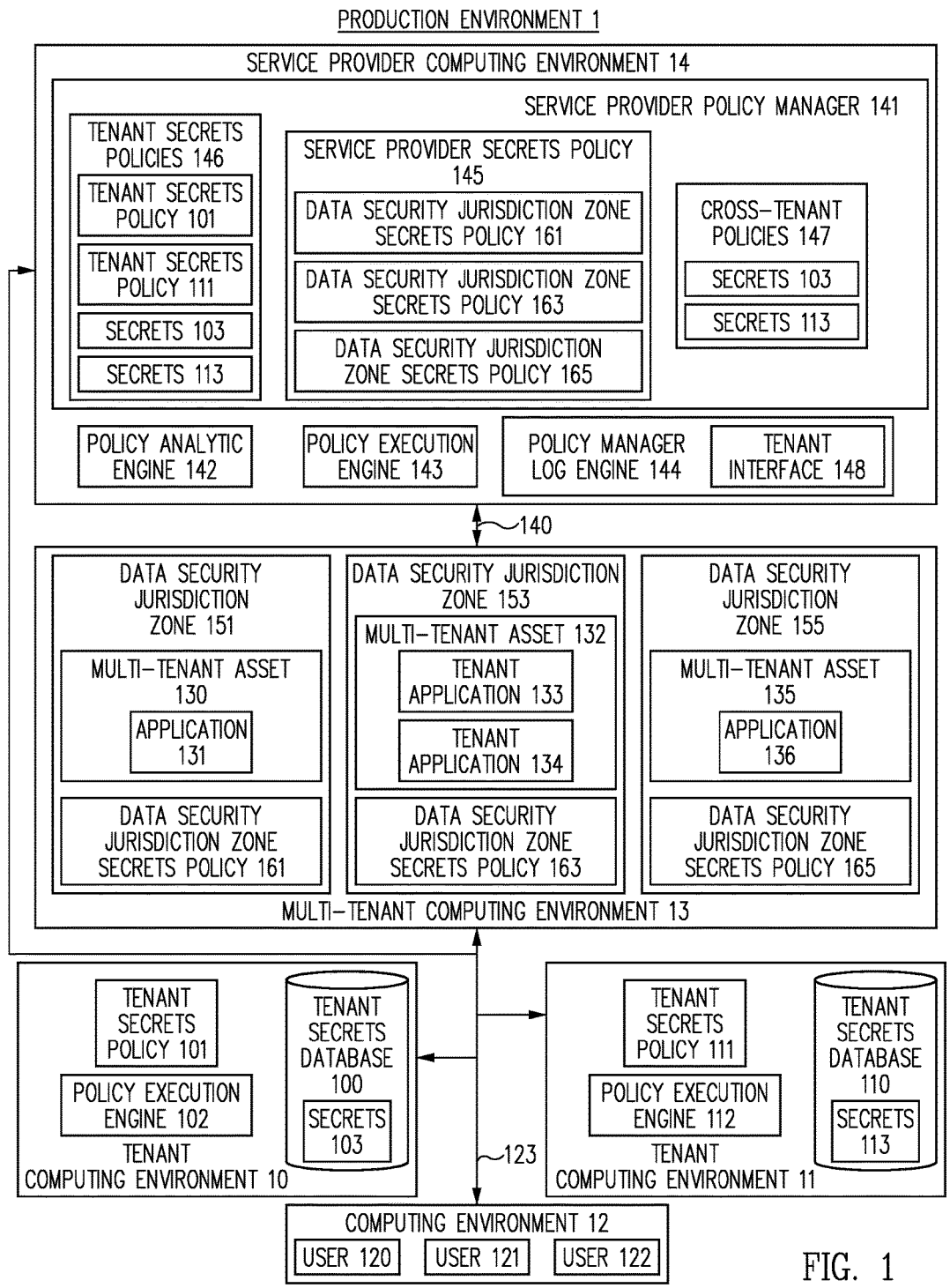
FIG. 1 is a block diagram of a hardware architecture for implementing multi-tenant secret management, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for incorporating various embodiments of methods and systems for managing tenant secrets in multi-tenant computing environments, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, an application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by AMAZON WEB SERVICE (AWS), RACK SPACE, JOYENT, and/or any other of the numerous cloud based infrastructure providers.

Other examples of virtual asset creation templates include, but are not limited to, any configuration management tool associated with and/or used to create virtual assets. One specific illustrative example of such a virtual asset creation template is a cookbook or recipe tool such as a CHEF RECIPE or system or any other fundamental element, or set of elements, used to override the default settings on a node within an infrastructure or architecture.

Other examples of virtual asset creation templates include, but are not limited to, any virtual appliance used to create or instantiate virtual assets. One specific illustrative example of such a virtual asset creation template is an AMAZON MACHINE IMAGE (AMI), and/or similar functionality provided by AMAZON WEB SERVICE, RACK SPACE, JOYENT, and/or any other of the numerous cloud based infrastructure providers.

Other examples of virtual asset creation templates include, but are not limited to, any appliance, or tool, or system, or framework, used to create or instantiate virtual assets as discussed herein, and/or as known/available in the art at the time of filing, and/or as developed/made available after the time of filing.

Herein, virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network; a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

Hardware Architecture

FIG. 1 illustrates a functional diagram of a production environment 1 that is configured to enable and perform multi-tenant secrets management for one or more multi-tenant assets in a multi-tenant (or multi-tenancy) computing environment, according to one embodiment. Multi-tenant computing environments enable service providers to deliver and/or provide services and resources to tenants or customers in quantities, speeds, and with resources that are flexibly and dynamically catered or customized to the specifications of the tenant/customer. The terms "tenant" and "customer" are used interchangeably herein and represent, according to various embodiments, a purchaser or recipient of computing infrastructure or other computing services from a service provider. A multi-tenant computing environment might include multi-tenant assets, such as an entire data center, one or more servers, one or more storage devices, or one or more applications that are shared by multiple customers. According to the particular needs or intended uses of the customer, it may be financially and/or logistically more feasible or profitable for a customer to rent, lease, or otherwise temporarily receive control over merely some, in contrast to all, assets available in a computing environment that is made available by a service provider. In exchange for lower cost and the dynamic availability of resources offered by the service provider, a customer or tenant accepts security risks associated with at least partially sharing the multi-tenant assets with other tenants. In some implementations, one tenant's information may be physically separated from another tenant's information, e.g., by being hosted from different servers or by being stored on different storage devices. However, in other implementations one tenant's information may merely be logically separated from another tenant's information and may therefore be susceptible to being intentionally or inadvertently compromised to other tenants. Service providers therefore allow tenants to apply tenant secrets or security measures, such as password protection and/or data encryption, to the tenants' information and/or to portions of the multi-tenant assets that are allocated to the tenants.

At times, a service provider's minimum requirements for secrets policies, a.k.a., security policies, may differ from the tenants' secrets policies, and a tenant's secrets policies may differ from another tenant's secrets policies. The system of production environment 1, disclosed herein, enables and/or provides management of multi-tenant secrets and multi-tenant secrets policies in, for example, multi-tenant computing environments, according to one embodiment.

The production environment 1 provides multi-tenant secrets management using one or more computing environments described hereinafter, according to various embodiments. Although each of the computing environments of production environment 1 are illustrated as distinct components, one or more of the computing environments may be physically and/or functionally combined. Alternatively, as will be appreciated by one of ordinary skill in the art, in some embodiments the functions that are grouped together by the illustrated computing environments may be physically and/or functionally separated into additional computing environments that are not presently shown. According to one embodiment, the production environment 1 includes a tenant computing environment 10, a tenant computing environment 11, a computing environment 12, a multi-tenant computing environment 13, and a service provider computing environment 14. Although two tenant computing environments 10 and 11 are included, more tenant computing environments may be incorporated into the production environment 1, according to other embodiments.

The tenant computing environment 10 represents a computing environment of a tenant or customer of the service provider, according to one embodiment. The tenant computing environment 10 may be owned, operated, or be under the direction or control of any one of a number of types of customers. According to various embodiments, a tenant or customer includes, but is not limited to, one or more individuals, families, small/medium/large businesses, educational institutions, or other for-profit or non-profit organizations. In one embodiment, the tenant computing environment 10 includes a tenant secrets database 100, a tenant secrets policy 101, and a policy execution engine 102.

The tenant secrets database 100 stores, maintains, organizes, sorts, and/or hosts the secrets 103 of a tenant, e.g., a first tenant, according to one embodiment. The secrets 103 of a tenant include, but are not limited to, passwords, codes, encryption keys, digital certificates, and other security measures that are currently available or that will become available to enable a tenant to prevent unauthorized access, viewing, copying, distribution, or other use of a tenant's data or information. According to one embodiment, the secrets 103 are, at least partially, means for securing tenant information or data. According to another embodiment, the tenant secrets database 100 also stores one or more copies of secrets data, which is the information or data of the tenant to which the secrets 103 are applied in order to protect the information or data from unauthorized access or use.

The tenant secrets policy 101 includes rules for governing the use, distribution, creation, and/or destruction of the secrets 103 of the tenant, according to one embodiment. The tenant secrets policy 101 can define the length, e.g., 800-bit encryption keys, and type, e.g., symmetric public-key infrastructure encryption keys, of secrets or security measures used. The tenant secrets policy 101 can also define the frequency with which secrets are rotated, cycled, or renewed for any particular group or set of information to which the secrets are applied. In one particular example, the tenant secrets policy 101 can include a 3-month rule/requirement to rotate encryption keys used for protecting tenant data stored or used in the multi-tenant computing environment 13. In other implementations, the rotation rule for the encryption keys can be monthly, bi-monthly, quarterly, semi-annually, annually, or the like, and can apply to other or all secrets 103 maintained by the tenant secrets database 100. In one embodiment, the tenant secrets policy 101 can specify different lengths and/or types of secret rules, for use in various scenarios. For example, the tenant secrets policy 101 may specify a first rule for multi-tenancy assets, a second role for dedicated or non-shared assets, a third rule for cloud storage, a fourth rule for private network storage, and so forth.

In yet other embodiments, the tenant secrets policy 101 can provide exceptions or limited provisions for sharing secrets 103 of a tenant with other tenants. For example, if a first tenant and a second tenant mutually provide software, an application, analytical services, or other services to one or more users, the tenant secrets policy 101 can include rules for authorizing or rejecting requests for access to the secrets 103 by other tenants. In a more specific example, the tenant secrets policy 101 may include a rule that authorizes distribution of a password or encryption key of a first tenant to a second tenant if the second tenant obtains permission from a service provider that provides services to both the first and second tenants. As another specific example, the tenant secrets policy 101 may include a rule that authorizes distribution of the password or encryption key of a first tenant to a second tenant if the second tenant mutually subscribes to one or more particular services, e.g. cloud storage or other web-based services, from a particular service provider. As can be appreciated by those of ordinary skill in the art, other examples of rules may be included in the tenant secrets policy 101 to define or specify when a first tenant's secrets 103 may be temporarily or permanently shared with a second tenant. In one embodiment, the tenant secrets policy 101 includes a rule for changing or rotating encryption keys after a predetermined time, e.g., 48 hours, after a first tenant shares one or more encryption keys or other secrets with a second tenant, to limit the duration with which the first tenant's protected data is shared.

The policy execution engine 102 applies the secrets 103 to the tenant's data or a tenant's users' data, in accordance with the tenant secrets policy 101, according to one embodiment. In one embodiment, the policy execution engine 102 is a daemon that runs in the background of the tenant computing environment 10 to automatically apply, update or rotate the secrets 103 continuously, periodically, or in response to events/triggers, in accordance with the tenant secrets policy 101. Alternatively, the policy execution engine 102 may be a program that executes the tenant secrets policy 101, in direct response to instructions from the tenant of the tenant computing environment 10. The policy execution engine 102 may be blocked from applying the tenant secrets policy 101 to assets within the multi-tenant computing environment 13, unless or until the policy execution engine 102 receives permission/authorization from the service provider, e.g., via the service provider computing environment 14, according to one embodiment.

The tenant computing environment 11 is owned, operated, or under the direction/control of a service provider customer or tenant that is different than the customer or tenant of the tenant computing environment 10, according to one embodiment. The tenant computing environment 11 may operate in a similar manner to the tenant computing environment 10. The tenant computing environment 11 includes a tenant secrets database 110, a tenant secrets policy 111, and a policy execution engine 112, according to one embodiment. The tenant secrets database 110 also includes secrets 113, e.g., one or more passwords, encryption keys, and digital certificates that are different than the secrets 103, according to one embodiment. The tenant secrets policy 111 may include similar secrets or security rules as the tenant secrets policy 101, or the tenant secrets policy 111 may include secrets or security rules that are different than the tenant secrets policy 101, according to various embodiments. The policy execution engine 112 is configured to apply the tenant secrets policy 111 to the tenant's information (including the tenant's users' information) that is stored or hosted by the multi-tenant computing environment 13, according to one embodiment. In one embodiment, the tenant of the tenant computing environment 10 is a first tenant or customer of the service provider, and the tenant of the tenant computing environment 11 is a second tenant or customer of the service provider. The first tenant and the second tenant may constitute just two of multiple tenants that are allocated resources or multi-tenant assets within the multi-tenant computing environment 13, according to one embodiment.

The computing environment 12 includes multiple users that may have contractual or other relationships with the tenants of the tenant computing environments 10 and 11. The computing environment 12 includes a user 120, a user 121, and a user 122, according to one embodiment. As will be appreciated by one of ordinary skill in the art, the computing environment 12 may include more or less users than illustrated in the production environment 1. In one embodiment, the user 120 receives information or services from the tenant of the tenant computing environment 10, e.g., the first tenant, and not from the tenant of the tenant computing environment 11, e.g., the second tenant. In one example embodiment, the user 120 may receive services from the first tenant that are associated with managing financial assets of the user 120. The user 121 may receive services from the second tenant that are different than the services provided by the first tenant. The user 122 may receive services from both the first tenant and the second tenant either separately or concurrently, according to one embodiment.

A network communication channel 123 provides communicative coupling between the tenant computing environment 10, the tenant computing environment 11, the computing environment 12, the multi-tenant computing environment 13, and the service provider computing environment 14, according to one embodiment. As described above, the network communication channel 123 within the production environment 1 can include, but is not limited to, a local area network, a wide area network, a wireless network, the Internet, and intranet, or other network or communications protocols or environments.

The multi-tenant computing environment 13 provides hardware, software, and/or virtual resources and assets to customers of the service provider, according to one embodiment. The assets or resources of the multi-tenant computing environment 13 may be assigned or allocated to the tenants associated with the tenant computing environments 10 and 11, in response to one or more of the tenants entering an agreement, contract, or other relationship with the service provider, according to one embodiment. As described above in the INTRODUCTORY SYSTEM section, assets can include virtual and non-virtual assets and can be, but are not limited to, virtual machines, virtual servers, databases, services associated with cloud computing, communications systems, mobile devices, sensors, various computing systems and other physical or logical portions of a data center, according to various embodiments.

The multi-tenant computing environment 13 includes a multi-tenant asset 130 hosting an application 131, a multi-tenant asset 132 hosting tenant applications 133 and 134, and a multi-tenant asset 135 hosting an application 136, according to various embodiments. Although three multi-tenant assets 130, 132, and 135 are included in the production environment 1, one of ordinary skill in the art will understand that more multi-tenant assets or less multi-tenant assets than those shown may be included in the multi-tenant computing environment 13, according to other embodiments.

According to various embodiments, multi-tenant asset 130 is shown as residing in data security jurisdiction zone 151, multi-tenant asset 132 is shown as residing in data security jurisdiction zone 153, and multi-tenant asset 135 is shown as residing in data security jurisdiction zone 155. Although three data security jurisdiction zones 151, 153, and 155 are included in the production environment 1, one of ordinary skill in the art will understand that more data security jurisdiction zones or less data security jurisdiction zones than those shown may be included in the multi-tenant computing environment 13, according to other embodiments. Although three multi-tenant assets 130, 132, and 135 are shown as residing in data security jurisdiction zones 151, 153, and 155, respectively, one of ordinary skill in the art will understand that more or less multi-tenant assets than those shown may be included in the data security jurisdiction zones 151, 153, and 155, according to other embodiments.

The service provider computing environment 14 assigns or allocates control over one or more assets or parts of assets in the multi-tenant computing environment 13 to the tenants of, or to the tenant computing environments 10 and 11, according to one embodiment. The service provider computing environment 14 may allocate control over assets to the tenant computing environments 10 and 11 by creating one or more user accounts having, for example, permission levels associated with a 'tenant' or 'customer'. In one embodiment, the tenant or customer permission levels may enable the tenant computing environments 10 and 11 to add, remove, modify, protect, or otherwise manipulate information within the multi-tenant computing environment 13 that is associated with the particular tenant computing environment 10 or 11. In other words, the service provider may enable a first tenant to add, remove, view, or otherwise manipulate the first tenant's data stored in the multi-tenant computing environment 13 and may enable a second tenant to add, remove, view, or otherwise manipulate the second tenant's data stored in the multi-tenant computing environment 13. In some implementations, a tenant associated with the tenant computing environment 10 or 11 may use authentication information received from the service provider to "log in" to assets allocated to the tenant from any computing system or environment, and is not limited to accessing the multi-tenant computing environment 13 solely from the tenant computing environment 10 or 11.

According to various embodiments, each of the assets and applications of the multi-tenant computing environment 13 can have a particular function and/or relationship with the tenant computing environments 10 and 11. In one embodiment, the multi-tenant asset 130 and the application 131 provide a service to both of the tenant computing environments 10 and 11. For example, the multi-tenant asset 130 and the application 131 can provide one or more services such as database hosting, information management/security, file transfer services, or the like. In one embodiment, the multi-tenant asset 132 allows tenants to execute, host, or run applications from the resources of the multi-tenant asset 132. For example, the multi-tenant asset 132 may allow one tenant to host the tenant application 133 while concurrently allowing another tenant to host the tenant application 134. The tenant applications 133 and 134 may be independent of one another but may share storage space, network resources, computer processors, random access memory, server rack storage space, or other aspects of the multi-tenant asset 132. In one embodiment, the multi-tenant asset 135 provides resources that enable the tenants to jointly provide a user services through the application 136. For example, the application 136 may receive, store, and organize financial data for the user 122 using functions/features/operations supplied by a first tenant, and the application 136 may analyze the financial data for the user 122 using functions/features/operations supplied by a second tenant. The application 136 can include, for example, a financial data engine supplied by the first tenant and an analytics engine supplied by the second tenant in such a manner that the tenants do not share source code while sharing clientele, e.g., the user 122, and the resulting revenue from the clientele, according to one embodiment.

The service provider computing environment 14 manages whether and how the tenant secrets policies are applied to the assets of the multi-tenant computing environment 13, according to one embodiment. The service provider computing environment 14 manages the application of tenant secrets policies by authorizing or rejecting requests for implementing tenant secrets policies, according to one embodiment. For example, the service provider computing environment 14 can receive a request from the tenant computing environment 10 or 11 to apply a tenant secrets policy 101 or 111.

The service provider computing environment 14 then compares the tenant secrets policy to the service provider secrets policy and authorizes the implementation of the tenant secrets policy if the tenant secrets policy complies with or is more restrictive than the service provider secrets policy, according to one embodiment.

In various embodiments, tenant secrets policy 111 is compared with the service provider secrets policy 145 with respect to the data security jurisdiction zone secrets policy 161 of the data security jurisdiction zone 151 of the multi-tenant asset 130 to determine whether the secrets such as secrets 103 of the tenant secrets policy 101 are consistent with the allowed secrets of the data security jurisdiction zone secrets policy 161 of the data security jurisdiction zone 151, including, but not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone of the multi-tenant asset.

As used herein, the term "secrets" includes any information, credentials, or other devices, necessary to protect, encrypt, and/or access, data, one or more resources, one or more virtual assets, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, secrets such as secrets 103 and secrets 113 are of one or more types, or classifications, of secrets. In various embodiments, the secrets are classified according to the type of resource the secret is used to access. For example, usernames, passwords, and passphrases, necessary to access various applications may be classified as user account access secrets, while digital certificates associated with Secure Socket Layer (SSL) communications channels may be classified as communication secrets, and encryption keys would be classified as encryption secrets.

In addition, the secrets, such as secrets 103 and secrets 113, can be classified according to the level of security provided by the secrets. For instance, encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets, such as secrets 103 and secrets 113, can be classified according to whether the secrets provide access to internal resources, such as databases and data in a data center, or access to external resources such as services offered through a cloud or the Internet.

The service provider computing environment 14 is communicatively coupled to the other computing environments of the production environment 1 via the network communication channel 123. In one embodiment, the service provider computing environment 14 may be communicatively coupled to the multi-tenant computing environment 13 by a back-end or trusted communication channel 140.

The service provider computing environment 14 includes a service provider secrets policy manager 141, a policy analytic engine 142, a policy execution engine 143, and a policy manager log engine 144. The service provider policy manager 141, in addition to the other modules or components of the service provider computing environment 14, may be used to implement, orchestrate, or apply several tenant secrets policies to the multi-tenant assets of the multi-tenant computing environment 13.

The service provider policy manager 141 may be configured for receiving, maintaining, analyzing, and/or applying one or more tenant secrets policies 101 and 111 associated with the computing environments of the production environment 1. The service provider policy manager 141 includes a service provider secrets policy 145, tenant secrets policies 146, and cross-tenant policies 147. The service provider policy manager 141 receives requests from tenant computing environments 10 and 11 regarding tenant secrets policies 146. In one embodiment, the requests from the tenant computing environments 10 and 11 are seeking permission or authorization to change or apply tenant secrets policies to assets in the multi-tenant computing environment 13. In response to the request from the tenant computing environments, the service provider policy manager 141 may be configured to compare rules, factors, or characteristics of the tenant secrets policies 146 to corresponding rules, factors, or characteristics of the service provider secrets policy 145. For example, the service provider policy manager 141 may compare a frequency of encryption key rotation, e.g., every three months, of the tenant secrets policy 101 to a required frequency of encryption key rotation, e.g., annually, of the service provider secrets policy 145. If the service provider policy manager 141 determines that the tenant secrets policy 101 satisfies (or is more restrictive than) the requirements or standards set forth by the service provider secrets policy 145, then the service provider policy manager 141 may authorize the request to, for example, apply, execute, or implement the tenant secrets policy 101 in the multi-tenant computing environment 13, according to one embodiment.

The service provider secrets policy 145 includes rules, requirements, and/or standards for maintaining information security within the assets of the multi-tenant computing environment 13, according to one embodiment. The service provider secrets policy 145 may specify: the types of secrets that tenants may use; minimum password or encryption key lengths; and a frequency by which the secrets are to be rotated, changed, or updated, according to one embodiment.

In various embodiments, the service provider secrets policy 145 includes data security jurisdiction zone secrets policy 161, data security jurisdiction zone secrets policy 163, and data security jurisdiction zone secrets policy 165. The data security jurisdiction zone secrets policies 161, 163, and 165 can include, but are not limited to, data security policies associated with political entities such as local, state, national, or regional government agencies; data security policies associated with networks or sub-networks of computing systems such as virtual private networks, local area networks, and wide area networks, and/or portions thereof; data security policies associated with cloud computing environments, or portions of cloud computing environments, such as virtual private clouds, private clouds, or portions of a cloud computing environment implemented in different geographic regions; and/or any other communications policies related to any data security jurisdiction zone setting forth the secrets policy for that data security jurisdiction zone.

In various embodiments, the data security jurisdiction zone secrets policies 161, 163, and 165 include data indicating allowed encryption levels within the identified data security jurisdiction zones. Consequently, in various embodiments, the allowed secrets data is allowed encryption key data including at least one encryption key in compliance with the data security policy data for the data security jurisdiction zone of the resource.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

The tenant secrets policies 146 include the tenant secrets policies of the tenants of the multi-tenant computing environment 13, according to one embodiment. In one embodiment, the tenant secrets policies 146 include the tenant secrets policy 101 and the tenant secrets policy 111. The service provider policy manager 141 may receive and store copies of tenant secrets policies for each of the tenants that are allocated resources/assets in the multi-tenant computing environment 13, according to one embodiment. In other embodiments, the tenant secrets policies 146 receive portions of the tenant secrets policies 101 and 111 with requests for authorization from the tenants or the tenant computing environments 10, 11 to apply or implement the tenant secrets policies. In some embodiments, the tenant secrets policies 146 also include temporary or permanent copies of the secrets 103 and/or secrets 113 to enable the service provider policy manager 141 to verify that the tenant's secrets meet minimum requirements for secrets, as established or set forth in the service provider secrets policy 145. In one embodiment, the tenant secrets policies 146 also include temporary or permanent copies of the secrets 103 and/or secrets 113 to enable the service provider policy manager 141 to selectively distribute copies of the secrets 103 and/or secrets 113 to the applications and/or multi-tenant assets of the multi-computing environment 13.

The cross-tenant policies 147 include rules for authorizing one tenant to access or receive the secrets of another tenant. For example, the application 136 can include functions/operations from a first tenant and functions/operations from the second tenant to provide multi-tenant services to data of tenant users, e.g., the users 120, 121, 122. To apply the functions of the first tenant and of the second tenant to the users' data, the second tenant's functions may need to decrypt the users' data using the first tenant's secrets (e.g., the secrets 103) prior to executing the second tenant's functions. The second tenant's functions may be configured to request, from the service provider policy manager 141, some of the first tenant's secrets, to complete execution of the application 136. In response, the service provider policy manager 141 may verify that the request from the second tenant's functions comply with the cross-tenant policies 147. For example, the cross-tenant policies 147 may include a list, a database, a table, or other data structure that identifies which tenants are authorized to receive secrets of other tenants for collaborative use within the multi-tenant computing environment 13. In some implementations, the cross-tenant policies 147 include copies of the secrets 103 and/or 113, to support selective distribution of the secrets 103 and/or secrets 113 to tenants that are collaboratively using multi-tenant assets, e.g., the multi-tenant assets 130, 132, 135.

The service provider policy manager 141 uses the policy analytic engine 142 and the policy execution engine 143 to apply tenant secrets policies to the assets of the multi-tenant computing environment 13, according to one embodiment. The policy analytic engine 142 can be used or configured to compare aspects of the tenant secrets policies 146 to the service provider secrets policy 145 to assist the service provider policy manager 141 in authorizing or rejecting requests to apply tenant secrets policies to multi-tenant assets.

The policy execution engine 143 may be used or configured to apply tenant secrets policies 146, if the policies satisfy the rules or requirements of the service provider secrets policy 145. According to one embodiment, the function of the policy execution engine 143 resides in and is executed by tenant computing environments 10 and 11 and the policy execution engines 102 and 112, respectively. In some embodiments, the policy analytic engine 142 and/or the policy execution engine 143 are modules that are separate from the service provider policy manager 141. In other embodiments, the policy analytic engine 142 and/or the policy execution engine 143 are modules that are integrated into the service provider policy manager 141.

The service provider computing environment 14 includes a policy manager log engine 144 to monitor, track, record, and/or report any handling of secrets 103 and/or 113 in addition to any handling of tenant secrets policies 101 and/or 111, according to one embodiment. Mishandling or mismanagement of secrets can result in direct and indirect damage to a user. For example, when private information, such as names and credit card information, are hacked or stolen from a user such as a large consumer goods retailer, the reputation, investor interest, and consumer confidence related to the consumer goods retailer are negatively impacted. Thus, tenants have a strong interest in protecting user data and in safeguarding secrets, e.g., the secrets 103, 113. The policy manager log engine 144 monitors, tracks, records, and/or reports the receipt, copy, transfer, distribution, destruction, backup, and/or restoration of the secrets 103 and/or 113, according to various embodiments. The policy manager log engine 144 can report this information to the tenants, upon request.

In one embodiment, the policy manager log engine 144 enables tenants to view and/or receive reports regarding the handling of their secrets through, for example, the tenant interface 148. The tenant interface 148 may provide a graphical user interface or a text-based user interface to enable a tenant to manually retrieve or automatically receive reports concerning the handling and/or management of the tenant's secrets.

Process

Figure 2:
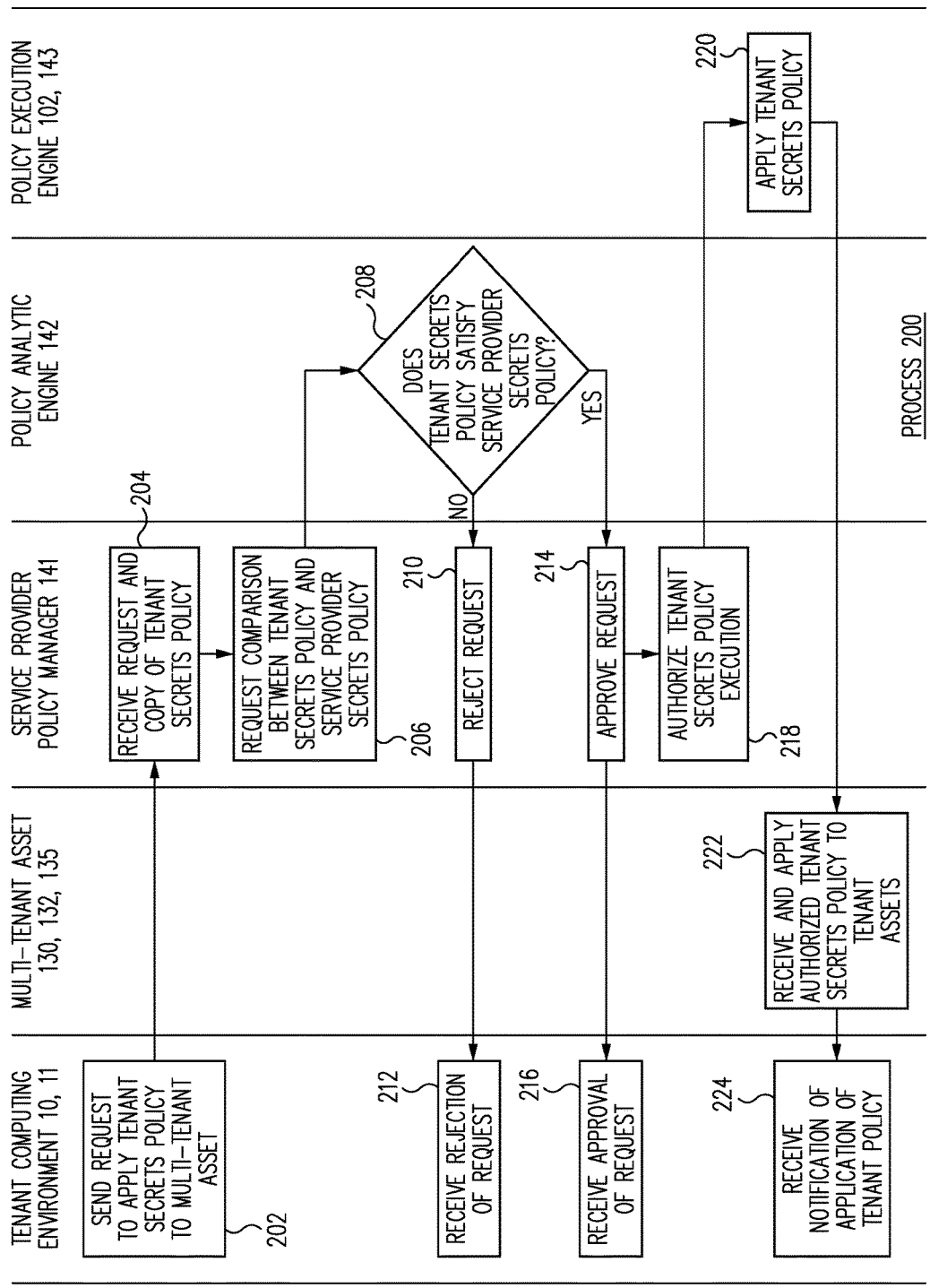
FIG. 2 is a flow diagram depicting a method for managing multi-tenant secrets policies in a multi-tenant computing environment, in accordance with one embodiment.

FIG. 2 illustrates a diagram of a process 200 for managing security policies, e.g., tenant secrets policies, for multi-tenant assets within the production environment 1, according to various embodiments.

At block 202, the tenant computing environment 10 or 11 sends a request to apply a secrets policy to a multi-tenant asset, according to one embodiment. The tenant computing environment 10 or 11 sends the request to the service provider policy manager 141. According to one embodiment, the tenant computing environment 10 or 11 also sends a copy of the tenant secrets policy 101 or 111 and/or a copy of the secrets 103 or 113 with the request. According to another embodiment, the service provider policy manager 141 already maintains, retains, hosts, or manages copies of the tenant secrets policies 101 and 111, in addition to a copy of the secrets 103 and 113.

At block 204, the service provider policy manager 141 receives the request from the tenant computing environment 10 or 11, according to one embodiment. As discussed above, according to one embodiment, the service provider policy manager 141 also receives a copy of the tenant secrets policies 101 or 111 along with the request to apply the tenant secrets policy. Although the service provider policy manager 141 is specifically identified as receiving the request to apply a tenant secrets policy, in another embodiment, the service provider computing environment 14 or another component or modules within the service provider computing environment 14 receives the request.

At block 206, the service provider policy manager 141 sends a request to the policy analytic engine 142 to perform a comparison of the tenant secrets policy 101 or 111 to the service provider secrets policy 145, according to one embodiment. In alternative embodiments, the service provider policy manager 141 performs the comparison itself rather than delegating the operation to another module.

At block 208, the policy analytic engine 142 compares the tenant secrets policy 101 or 111 to the service provider secrets policy 145, according to one embodiment. The policy analytic engine 142 can be configured to compare the tenant secrets policy 101 or 111 to the service provider secrets policy 145 by comparing corresponding rules, factors, or characteristics. For example, each of the secrets policies can include rules relating to the frequency with which secrets, e.g., encryption keys, are rotated in the multi-tenant assets. As another example, each of the secrets policies can include rules relating to the types of secrets allowable, e.g., passwords and/or encryption keys, and can include rules specifying allowable lengths of secrets, e.g., 400 bit encryption keys. The policy analytic engine 142 compares the rules of the tenant secrets policy 101 or 111 to the service provider secrets policy 145 to determine whether the tenant secrets policy satisfies the service provider secrets policy. In one embodiment, the tenant secrets policy satisfies the service provider secrets policy if the tenant secrets policy is at least as restrictive as the service provider secrets policy. In other words, if the tenant secrets policy is as restrictive as the service provider secrets policy, or if the tenant secrets policy is more restrictive than the service provider secrets policy, then the policy analytic engine 142 determines that the tenant secrets policy satisfies the requirements of the service provider secrets policy. As a specific example, if the tenant secrets policy 101 specifies that encryption keys are required to be rotated once every six months and the service provider secrets policy 145 only requires that encryption keys be rotated once every nine months then the policy analytic engine 142 determines that the tenant secrets policy 101 is more restrictive than the service provider secrets policy 145 and that the tenant secrets policy 101 satisfies the service provider secrets policy 145.

In one embodiment, the tenant secrets policy 101 is compared with the data security jurisdiction zone secrets policy 161 of the data security jurisdiction zone 151 in which a multi-tenant asset 130 is located. The tenant secrets policy 101 is compared with the data security jurisdiction zone secrets policy 161 to determine whether secrets 103 of the tenant secrets policy 101 are consistent with the allowed secrets of the data security jurisdiction zone secrets policy 161. The secrets 103 include, but are not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone 151 of the multi-tenant asset 130.

The policy analytic engine 142 notifies the service provider policy manager 141 of the results of the comparison, according to one embodiment. If the tenant secrets policy does not satisfy the service provider secrets policy, the process 200 proceeds to block 210 to notify the service provider policy manager 141 that the tenant secrets policy did not satisfy the service provider secrets policy. If the tenant secrets policy satisfies the service provider secrets policy, the process 200 proceeds to block 214 to notify the service provider policy manager that the tenant secrets policy does satisfy the service provider secrets policy.

At block 210, the service provider policy manager 141 transmits a notification of request rejection to the tenant computing environment 10 or 11, from which the request originated. In one embodiment, the service provider policy manager 141 includes reasons for the rejection and/or includes instructions for overcoming the rejection.

At block 212, the tenant computing environment 10 or 11 receives the notification rejection of the request and the process 200 terminates, according to one embodiment.

At block 214, the service provider policy manager 141 transmits a request approval notification to the tenant computing environment 10 or 11. The service provider policy manager 141 also proceeds to execute the approved tenant secrets policy, according to one embodiment. From the block 214, the process 200 proceeds concurrently to block 216 and block 218, according to one embodiment.

At block 216, the tenant computing environment 10 or 11 receives the notification of the approval from the service provider policy manager 141, according to one embodiment. In other embodiments, the tenant computing environment 10 or 11 receives the notification of approval directly from the policy analytic engine 142. In response to receiving notification of the approval of the request, the tenant computing environment 10 or 11 authorizes a policy execution engine 102 to apply the tenant secrets policy, e.g., as shown in block 220. In other embodiments, as illustrated in the process 200, the service provider policy manager 141 authorizes the execution of the tenant secrets policy that satisfies the service provider secrets policy, e.g., as shown in block 218.

At block 218, the service provider policy manager 141 authorizes execution of the tenant secrets policy, in response to receiving notification from the policy analytic engine 142 that the tenant secrets policy satisfies the service provider secrets policy, according to one embodiment. The service provider policy manager 141 may then apply the tenant secrets policy to the multi-tenant assets 130, 132, and/or 135, in one embodiment. In another embodiment, the process 200 proceeds to block 220.

At block 220, the policy execution engine 102 or 143 applies the tenant secrets policy, in response to approval or instruction from the service provider policy manager 141, according to one embodiment. The policy execution engine 102 or 143 may apply the tenant secrets policy by parsing the request, identifying portions of the tenant secrets policy to be applied, establishing a connection to one or more multi-tenant assets 130, 132, and 135, and providing instructions to the multi-tenant asset(s) in accordance with the tenant secrets policy associated with the request.

At block 222, one or more multi-tenant assets 130, 132, and 135 apply the authorized tenant secrets policy to assets allocated to the tenant associated with the tenant secrets policy, according to one embodiment. In one embodiment, the one or more multi-tenant assets 130, 132, and 135 apply the authorized tenant secrets policy by updating one or more tables, databases, or other data structures with the new rules, or with updates to pre-existing rules, that are being modified by the tenant secrets policy.

At block 224, the tenant computing environment 10 or 11 receives notification from the one or more multi-tenant assets 130, 132, and 135 that the tenant secrets policy has been applied to the multi-tenant asset(s), according to one embodiment. Upon receipt of the notification, the tenant computing environment 10 or 11 may update its corresponding tenant secrets database 100 or 110 to reflect the current tenant secrets policy that is associated with and applied to the multi-tenant asset(s). At block 224, the process 200 terminates.

Figure 3:
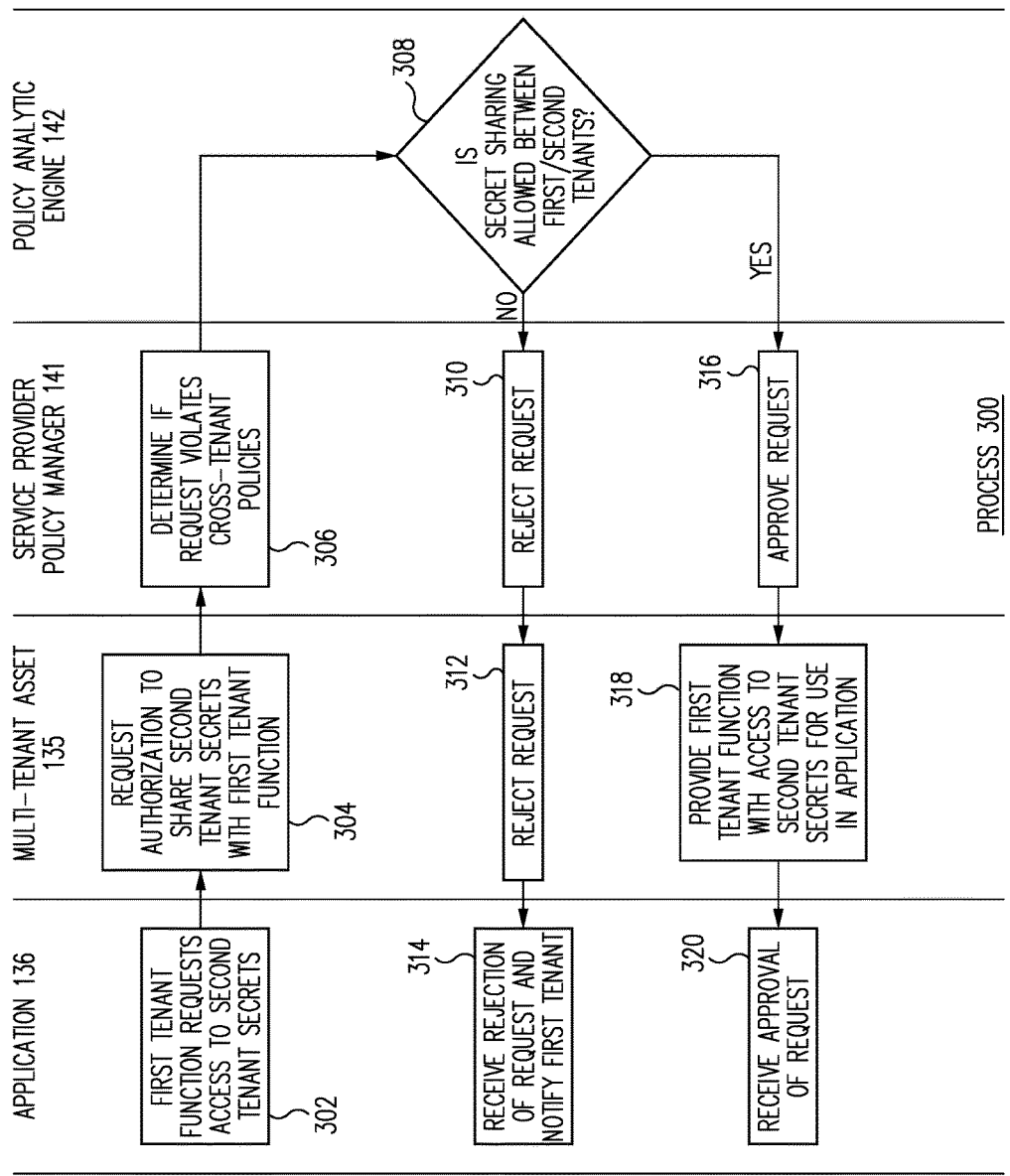
FIG. 3 is a flow diagram depicting a method for managing cross-tenant policies in a multi-tenant computing environment, in accordance with one embodiment.

FIG. 3 illustrates a diagram of a process 300 for managing cross-tenant secrets sharing within the production environment 1, according to one embodiment.

At block 302, the application 136 includes a first tenant function that requests access to second tenant secrets, according to one embodiment. As discussed above, the application 136 may be an application that includes functions/operations that are provided by more than one tenant, e.g., a first tenant and a second tenant. In other words, a first tenant may provide some functions of the application 136 and a second tenant may provide other functions of the application 136. According to one embodiment, the first tenant may apply secrets 103 to data of first tenant users associated with the application 136, and the second tenant may apply the secrets 113 to data of second tenant users associated with the application 136. For the application to apply the features of both tenants to user data, the first tenant may need access to second tenant secrets, e.g., the secrets 113, and the second tenant may need access to first tenant secrets, e.g., the secrets 103, according to one embodiment. However, to maintain security over each tenants' users' data, each tenant may maintain encryption of its users' data until and unless access to the tenant's secrets is requested by another tenant.

At block 304, the multi-tenant asset 135 requests authorization to share second tenant secrets with the first tenant function of the application 136, in response to a request received from the application 136, according to one embodiment. In one embodiment, the multi-tenant asset 135 includes copies of cross-tenant policies and copies of tenants' secrets, and the multi-tenant asset 135 authorizes or rejects the request to share secrets that was received from the application 136. In another embodiment, the multi-tenant asset 135 requests authorization to share tenant secrets with other tenants from, for example, the service provider policy manager 141.

At block 306, the service provider policy manager 141 determines if the request to share tenant secrets violates cross-tenant policies, e.g., cross-tenant policies 147, in one embodiment. The service provider policy manager 141 may itself analyze the cross-tenant policies 147 to determine if the requesting tenant is authorized to receive permanent or temporary access to the secrets of the other tenant of the request. The service provider policy manager 141 uses a spreadsheet, a table, a database, or other data structure to determine if the cross-tenant policies 147 permit secrets sharing between the first tenant and the second tenant, according to one embodiment. According to another embodiment, the service provider policy manager 141 analyzes the cross-tenant policies 147 to determine if cross-tenant secrets sharing is permitted for application 136 or for the users of the application 136, e.g., users 120, 121, 122. The service provider policy manager 141 may then directly reply to the request of the multi-tenant asset. In one embodiment, the service provider policy manager 141 delegates or assigns responsibility to the policy analytic engine 142 to determine if the cross-tenant secrets sharing request is permissible.

At block 308, the policy analytic engine 142 determines if secret sharing is allowed between the first and second tenants of the application 136, according to one embodiment. As discussed above, the policy analytic engine 142 may use a spreadsheet, a table, a database, or other data structure to determine if the cross-tenant policies 147 permit or allow secrets sharing between the first tenant and the second tenant, according to one embodiment. If the cross-tenant policies 147 do not permit the requested secrets sharing, the process 300 proceeds to: block 310, where the service provider policy manager 141 issues a request rejection; block 312, where the multi-tenant asset 135 issues a request rejection; and block 314, where the application 136 receives notification of the request rejection and notifies the first tenant, e.g., the tenant computing environment 10, according to one embodiment.

If the policy analytic engine 142 determines that the cross-tenant policies 147 permit or allow the first tenant function to receive the requested access to the second tenant secrets, e.g., the secrets 113, the process 300 proceeds to block 316.

At block 316, the service provider policy manager 141 approves the request from the first tenant function to receive at least partial access to secrets of the second tenant. The service provider policy manager 141 may provide one or more copies of second tenant secrets, e.g., the secrets 113, in addition to the copy of the cross-tenant policies 147 to the multi-tenant asset 135 for distribution to the application 136, according to one embodiment. In another embodiment, the service provider policy manager 141 transmits notification of authorization or approval of the request to the multi-tenant asset 135, so that the multi-tenant asset 135 can authorize the application 136 to use the second tenant secrets.

At block 318, the multi-tenant asset 135 provides the first tenant function with access to the second tenant secrets for use in the application 136, according to one embodiment. As described above, the multi-tenant asset 135 may receive copies of the second tenant secrets from the service provider policy manager 141, or the multi-tenant asset 135 may already store or maintain local copies of the second tenant secrets, for selective distribution to, for example, the application 136.

At block 320, the application 136 receives approval for the access request of the first tenant function to the second tenant secrets. The first tenant function may use the second tenant secrets to decrypt user data associated with the application 136 prior to performing one or more operations or functions on the unencrypted data, according to one embodiment. In one embodiment, the first tenant function is configured to decrypt the second tenant secrets, perform the first tenant function on the unencrypted data, and re-encrypt the data with the second tenant secrets, in accordance with the cross-tenant policies 147. At block 320, the process 300 ends.

Figure 4:
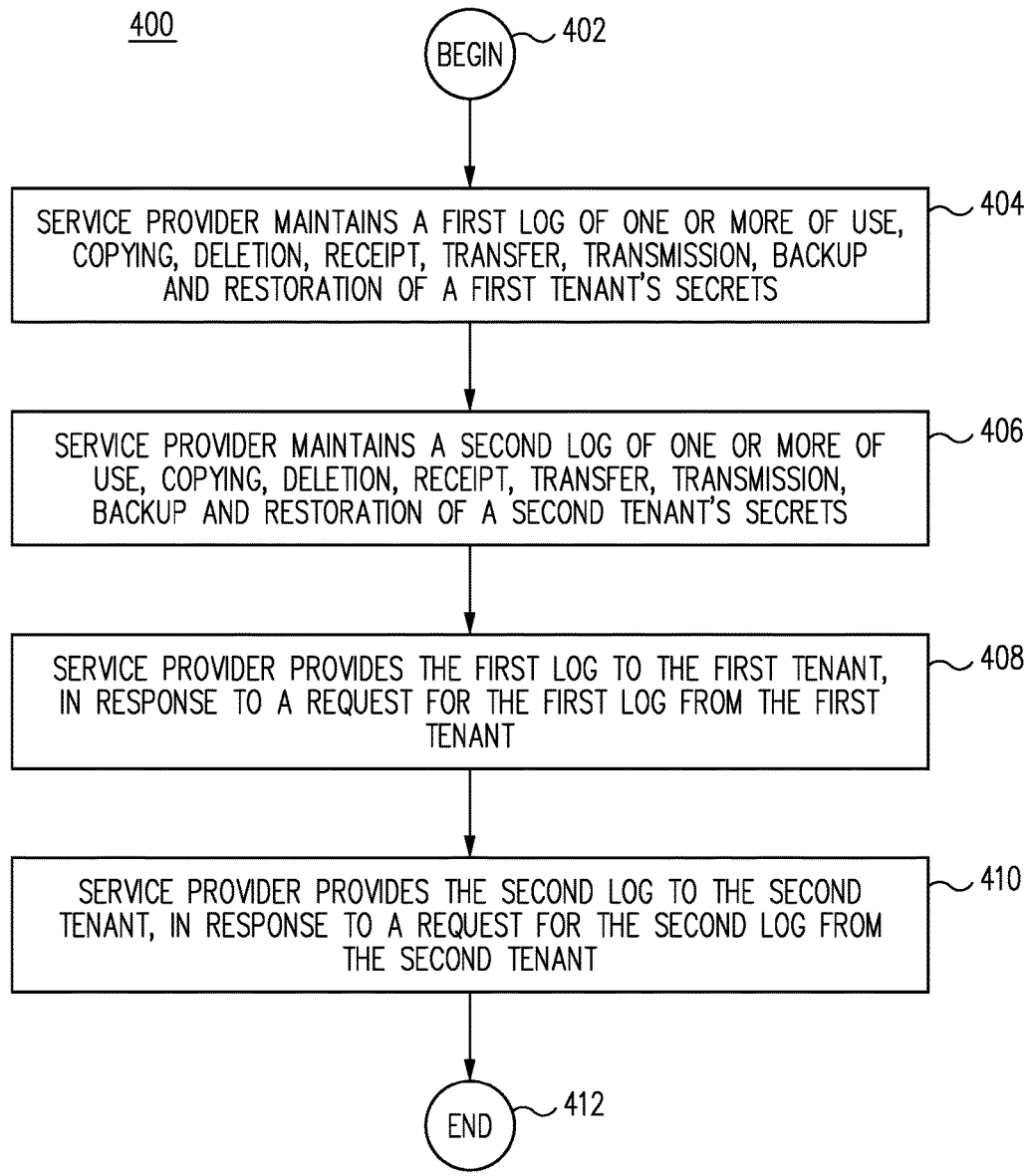
FIG. 4 is a flow diagram depicting a method for providing logging services to tenants in a multi-tenant computing environment, in accordance with one embodiment.

FIG. 4 illustrates a diagram of a process 400 for logging and reporting use of a tenant's secrets by a service provider, according to various embodiments.

At block 402, the process 400 begins.

At block 404, the service provider maintains a first log of one or more of the use, copying, deletion, receipt, transfer, transmission, backup, and restoration of a first tenant's secrets, according to one embodiment. The service provider may create and/or maintain the first log with a service provider computing environment, with a service provider policy manager, with a policy manager log engine, or with one or more other components or modules. The service provider may update the first log with each use or manipulation of one or more of the first tenant's secrets. In one embodiment, the service provider logs the creation of any backup copies of tenant secrets in addition to logging any data restoration operations that include one or more of the tenant's secrets. By allowing the tenant to view any or all operations or manipulations of the tenant's secrets, the tenant can determine if the service provider is taking appropriate actions and/or measurements to protect and manage the secrets of the tenant. In the event that the tenant determines that the service provider's management of the tenant's secrets is inadequate, the tenant may seek to establish relationships with a different, more secure or competent, service provider, according to one embodiment.

At block 406, the service provider maintains a second log of one or more of the use, copying, deletion, receipt, transfer, transmission, backup, and restoration of a second tenant's secrets, according to one embodiment.

At block 408, the service provider provides the first log to the first tenant, in response to receiving a request for the first log from the first tenant, according to one embodiment. In practice, the service provider may provide the first log and may receive a request for the first log by the service provider computing environment, and the request from the first tenant may be received by the service provider computing environment from a first tenant computing environment, according to one embodiment.

At block 410, the service provider or service provider computing environment provides the second log to the second tenant or second tenant computing environment, according to one embodiment. The service provider may provide the second log to the second tenant in response to a request for the second log from the second tenant. In one embodiment, the first and second tenants may require the service provider computing environment to automatically and/or periodically transmit copies of the first/second logs to the respective tenant computing environments, absent a request for the log from the tenant computing environments. In another embodiment, the service provider computing environment is configured to transmit a copy of one or more logs to the one or more tenant computing environments in response to a trigger or event. According to one embodiment, the trigger or events may be determined by the tenant computing environment and may include triggers or events such as a security breach, suspicious or excessive requests for access to tenant secrets, or any predetermined use or manipulation of one or more tenant secrets, e.g., including copying, transmitting, receiving, deleting, backing up, and restoring a copy of the tenant secret.

At block 412, the process 400 ends.

In accordance with one or more embodiments, a process for managing secrets of tenants in a multi-tenant computing environment includes identifying one or more data security jurisdiction zones to which secrets data may be transferred. In one embodiment, data security policy data for the identified data security jurisdiction zones is obtained including data indicating allowed secrets data for the respective data security jurisdiction zones.

In one embodiment, secrets request data representing a request that secrets data be transferred to a resource is received. In one embodiment, a determination of the data security jurisdiction zone associated with the resource is automatically made and security policy data associated with the determined data security jurisdiction zone of the resource is automatically retrieved.

In one embodiment, the data security policy data for the data security jurisdiction zone of the resource is automatically analyzed to determine allowed secrets data with respect to the data security jurisdiction zone of the resource and allowed secrets data with respect to the data security jurisdiction zone of the resource is automatically obtained. In one embodiment, the allowed secrets data is then automatically provided to the resource in the data security jurisdiction zone of the resource.

Figure 5:
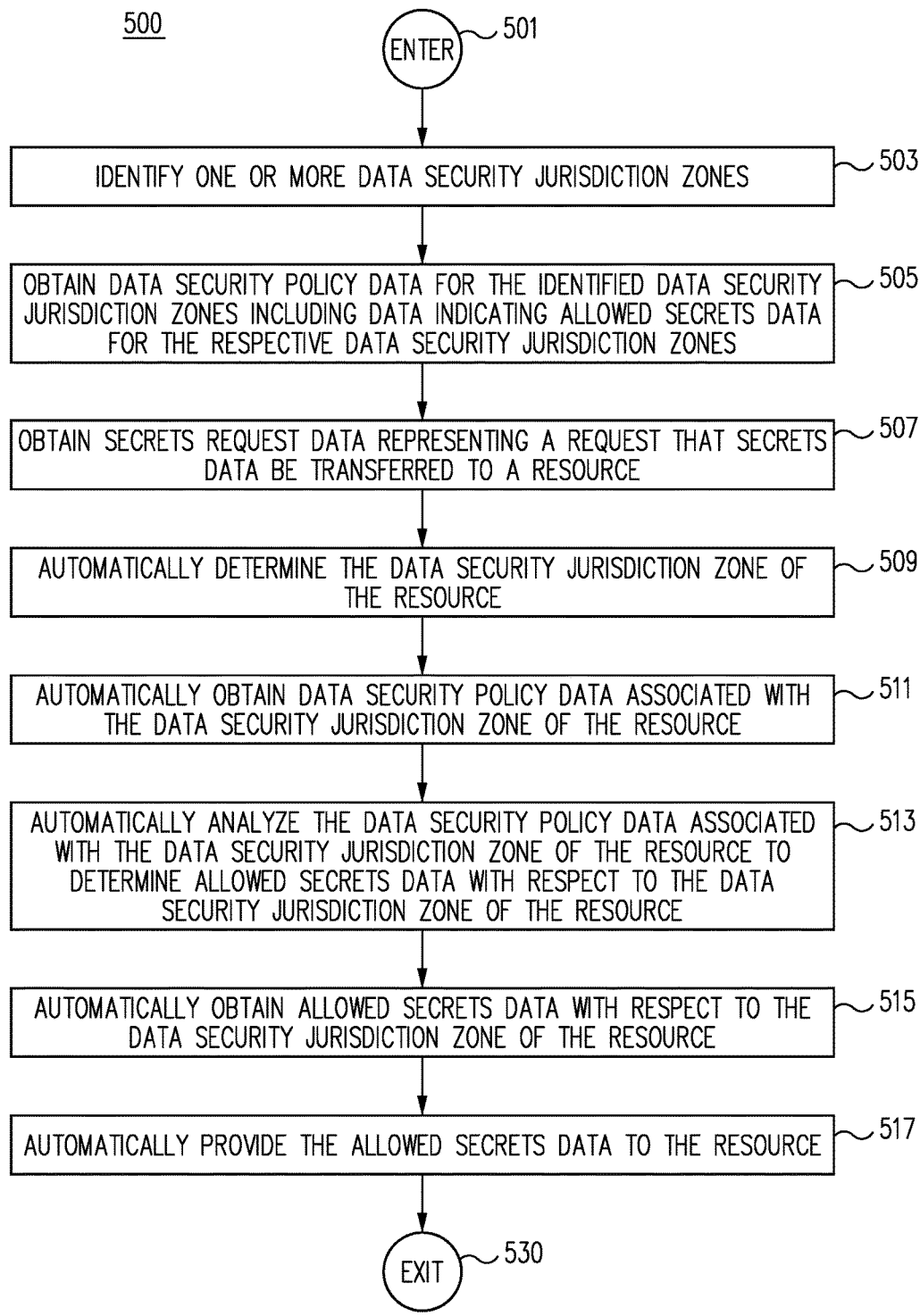
FIG. 5 is a flow chart depicting a process for managing secrets of tenants in a multi-tenant computing environment in accordance with one embodiment.

FIG. 5 is a flow chart of a process 500 for managing secrets of tenants in a multi-tenant computing environment in accordance with one embodiment. In one embodiment, process 500 for managing secrets of tenants in a multi-tenant computing environment begins at ENTER OPERATION 501 of FIG. 5 and process flow proceeds to IDENTIFY ONE OR MORE DATA SECURITY JURISDICTION ZONES OPERATION 503.

In one embodiment, at IDENTIFY ONE OR MORE DATA SECURITY JURISDICTION ZONES OPERATION 503 one or more data security jurisdiction zones from which, and/or to which, secrets data may be transferred are identified.

As noted above, herein data security jurisdiction zones can be, but are not limited to, physical geographical data security jurisdiction zones, such as geographical regions on the planet subject to specific data security policies; political zones, such as countries or states subject to specific data security policies; virtual data security zones, such as networks, clouds, or portions thereof, subject to specific data security policies; resources and/or networks of resources subject to specific data security policies; computing environments subject to specific data security policies; and/or any other physically, politically, or virtually, delineated data security jurisdiction zones subject to specific data security policies, as discussed herein, and/or as known in the art at the time of filing, and/or as developed/become known after the time of filing.

Consequently, as used herein, the term data security jurisdiction zone refers to both geographic and political zones as well as virtual data security zones within various computing environments.

In one embodiment, at IDENTIFY ONE OR MORE DATA SECURITY JURISDICTION ZONES OPERATION 503 the one or more data security jurisdiction zones are identified as data security jurisdiction zones likely to be the location of one or more resources within a cloud computing environment, or other decentralized computing system.

In one embodiment, once one or more data security jurisdiction zones from which, and/or to which, secrets data may be transferred are identified at IDENTIFY ONE OR MORE DATA SECURITY JURISDICTION ZONES OPERATION 503, process flow proceeds to OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505.

In one embodiment, at OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505 for each of the identified one or more data security jurisdiction zones of IDENTIFY ONE OR MORE DATA SECURITY JURISDICTION ZONES OPERATION 503, data security policy data is obtained including data indicating allowed secrets data with respect to the data security jurisdiction zone, and/or prohibited secrets data with respect to the data security jurisdiction zone.

In various embodiments, the data security policy data of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505 can include, but is not limited to, data security policy data associated with political entities such as local, state, national, or regional government agencies; data security policy data associated with networks or sub-networks of computing systems such as virtual private networks, local area networks, and wide area networks, and/or portions thereof; data security policy data associated with cloud computing environments, or portions of cloud computing environments such as virtual private clouds, private clouds, or portions of a cloud computing environment implemented in different geographic regions; and/or any other communications policy data related to any data security jurisdiction zone setting forth the allowed secrets data for that data security jurisdiction zone.

In one embodiment, the data security policy data of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505 is stored and/or managed and updated through a data security policy manager.

As noted above, the data security policy data for each data security jurisdiction zone of OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505 includes data indicating allowed secrets data with respect to the data security jurisdiction zone, and/or prohibited secrets data with respect to the data security jurisdiction zone.

As used herein, data representing secrets that can be used to protect data in a given data security jurisdiction zone, and/or data representing secrets that can be sent to the data security jurisdiction zone, and/or data representing data being transferred to the data security jurisdiction zone that has been protected by a secret that can be used to protect data in the data security jurisdiction zone, are collectively, and/or individually, referred to as allowed secrets data of the data security jurisdiction zone.

It follows that, as used herein, data representing secrets that can't be used to protect data in a given data security jurisdiction zone, and/or data representing secrets that can't be sent to the data security jurisdiction zone, and/or data representing data being transferred to the data security jurisdiction zone that has been protected by a secret that can't be used to protect data in the data security jurisdiction zone, are collectively, and/or individually, referred to as prohibited secrets data with respect to the data security jurisdiction zone.

In one embodiment, the data security policy data for the identified data security jurisdiction zones is stored in one or more databases controlled by a data security policy manager. In one embodiment, the data security policy data for the identified data security jurisdiction zones is updated automatically.

In one embodiment, once, for each of the identified one or more data security jurisdiction zones of IDENTIFY ONE OR MORE DATA SECURITY JURISDICTION ZONES OPERATION 503, data security policy data is obtained, including data indicating allowed secrets data with respect to the data security jurisdiction zone, and/or prohibited secrets data with respect to the data security jurisdiction zone, at OBTAIN DATA SECURITY POLICY DATA FOR THE IDENTIFIED DATA SECURITY JURISDICTION ZONES INCLUDING DATA INDICATING ALLOWED SECRETS DATA FOR THE RESPECTIVE DATA SECURITY JURISDICTION ZONES OPERATION 505, process flow proceeds to OBTAIN SECRETS REQUEST DATA REPRESENTING A REQUEST THAT SECRETS DATA BE TRANSFERRED TO A RESOURCE OPERATION 507.

In one embodiment, at OBTAIN SECRETS REQUEST DATA REPRESENTING A REQUEST THAT SECRETS DATA BE TRANSFERRED TO A RESOURCE OPERA- TION 507, secrets request data is received representing a request that secrets data be transferred to a resource.

Herein, the term "resource" refers to any software or hardware entity or component capable of transferring and/or receiving data. As one specific illustrative example, in one embodiment, the term resources includes a virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, a resource can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity or entities capable of transmitting and/or receiving data as discussed herein, and/or as known in the art at the time of filing, and/or as developed/made available after the time of filing.

As used herein, the term "secrets" includes any information, credentials, or other devices, necessary to protect, encrypt, and/or access, data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to protect and control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data of OBTAIN SECRETS REQUEST DATA REPRESENTING A REQUEST THAT SECRETS DATA BE TRANSFERRED TO A RESOURCE OPERATION 507, such as allowed secrets data and/or prohibited secrets data, are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets data of OBTAIN SECRETS REQUEST DATA REPRESENTING A REQUEST THAT SECRETS DATA BE TRANSFERRED TO A RESOURCE OPERATION 507, such as allowed secrets data and/or prohibited secrets data, can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data of OBTAIN SECRETS REQUEST DATA REPRESENTING A REQUEST THAT SECRETS DATA BE TRANSFERRED TO A RESOURCE OPERATION 507, such as allowed secrets data and/or prohibited secrets data, can be classified according to whether the secrets provide access to internal resources, such as databases and data in a data center, or access to external resources such as services offered through a cloud or the Internet.

In one embodiment, the different types of secrets of OBTAIN SECRETS REQUEST DATA REPRESENTING A REQUEST THAT SECRETS DATA BE TRANSFERRED TO A RESOURCE OPERATION 507 are provided by, and/or originate from, different secret sources. In one embodiment, the secrets data representing the different classes of secrets are maintained, at least initially, in separate secret databases, systems, or data stores, and/or in a master secrets database.

In one embodiment, at OBTAIN SECRETS REQUEST DATA REPRESENTING A REQUEST THAT SECRETS DATA BE TRANSFERRED TO A RESOURCE OPERATION 507, secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the secrets data controlled and/or accessed by secrets manager system includes data representing one or more types of secrets used to control access to one or more types of resources associated with the types of secrets by one or more entities, such as a virtual asset, residing physically or logically outside the data/resources services center where the secrets data is maintained, and/or accessed.

In one embodiment, once secrets request data is received representing a request that secrets data be transferred to a resource at OBTAIN SECRETS REQUEST DATA REPRESENTING A REQUEST THAT SECRETS DATA BE TRANSFERRED TO A RESOURCE OPERATION 507, process flow proceeds to AUTOMATICALLY DETERMINE THE DATA SECURITY JURISDICTION ZONE OF THE RESOURCE OPERATION 509.

In one embodiment, at AUTOMATICALLY DETERMINE THE DATA SECURITY JURISDICTION ZONE OF THE RESOURCE OPERATION 509, a determination is automatically made as to the data security jurisdiction zone of IDENTIFY ONE OR MORE DATA SECURITY JURISDICTION ZONES OPERATION 503 associated with the requesting resource that is the source of the secrets request data, i.e., a determination is automatically made as to the data security jurisdiction zone of the resource of OBTAIN SECRETS REQUEST DATA REPRESENTING A REQUEST THAT SECRETS DATA BE TRANSFERRED TO A RESOURCE OPERATION 507.

In one embodiment, at AUTOMATICALLY DETERMINE THE DATA SECURITY JURISDICTION ZONE OF THE RESOURCE OPERATION 509, the determination is automatically made as to the data security jurisdiction zone of the resource using information contained in the IP address associated with the resource, and/or any other mechanism as discussed herein, and/or as known in the art at the time of filing, and/or as developed/made available after the time of filing, for determining a data security jurisdiction zone associated with a resource.

In one embodiment, once a determination is automatically made as to the data security jurisdiction zone of IDENTIFY ONE OR MORE DATA SECURITY JURISDICTION ZONES OPERATION 503 associated with the requesting resource that is the source of the secrets request data, i.e., a determination is automatically made as to the data security jurisdiction zone of the resource of OBTAIN SECRETS REQUEST DATA REPRESENTING A REQUEST THAT SECRETS DATA BE TRANSFERRED TO A RESOURCE OPERATION 507 at AUTOMATICALLY DETERMINE THE DATA SECURITY JURISDICTION ZONE OF THE RESOURCE OPERATION 509, process flow proceeds to AUTOMATICALLY OBTAIN DATA SECURITY POLICY DATA ASSOCIATED WITH THE DATA SECURITY JURISDICTION ZONE OF THE RESOURCE OPERATION 511.

In one embodiment, once the data security jurisdiction zone of the resource is automatically determined at AUTOMATICALLY DETERMINE THE DATA SECURITY JURISDICTION ZONE OF THE RESOURCE OPERATION 509, the data security policy data for the data security jurisdiction zone of the resource is obtained at AUTOMATICALLY OBTAIN DATA SECURITY POLICY DATA ASSOCIATED WITH THE DATA SECURITY JURISDICTION ZONE OF THE RESOURCE OPERATION 511.

In one embodiment, at AUTOMATICALLY OBTAIN DATA SECURITY POLICY DATA ASSOCIATED WITH THE DATA SECURITY JURISDICTION ZONE OF THE RESOURCE OPERATION 511, the data security policy data for the data security jurisdiction zone of the resource is obtained from the data security policy data stored in one or more databases managed and controlled by the data security policy manager.

In one embodiment, once the data security policy data for the data security jurisdiction zone of the resource is obtained at AUTOMATICALLY OBTAIN DATA SECURITY POLICY DATA ASSOCIATED WITH THE DATA SECURITY JURISDICTION ZONE OF THE RESOURCE OPERATION 511, process flow proceeds to AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 513.

In one embodiment, at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 513, the data security policy data for the data security jurisdiction zone of the resource is automatically analyzed to determine allowed secrets data with respect to the data security jurisdiction zone of the resource that complies with the data security policy data of the data security jurisdiction zone of the resource.

In various embodiments, allowed secrets data with respect to the data security jurisdiction zone of the resource that complies with the data security policy data of the data security jurisdiction zone of the resource includes, but is not limited to, the allowed types and/or lengths of encryption applied to the data within, and/or allowed types and/or lengths of encryption applied to data to be transferred to, and/or data representing encryption keys for allowed types and/or lengths of encryption to be transferred to, the data security jurisdiction zone of the resource.

In other embodiments, other types of allowed secrets data with respect to the data security jurisdiction zone of the resource include any allowed secrets data as discussed herein, and/or as known in the art at the time of filing, and/or as developed/made available after the time of filing.

In one embodiment, once the data security policy data for the data security jurisdiction zone of the resource is automatically analyzed to determine allowed secrets data with respect to the data security jurisdiction zone of the resource that complies with the data security policy data of the data security jurisdiction zone of the resource at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 513, process flow proceeds to AUTOMATICALLY OBTAIN ALLOWED SECRETS DATA WITH RESPECT TO THE DATA SECURITY JURISDICTION ZONE OF THE RESOURCE OPERATION 515.

In one embodiment, once the data security policy data for the data security jurisdiction zone of the resource is automatically analyzed to determine allowed secrets data with respect to the data security jurisdiction zone of the resource that complies with the data security policy data of the data security jurisdiction zone of the resource at AUTOMATICALLY ANALYZE THE DATA SECURITY POLICY DATA ASSOCIATED WITH THE DATA SECURITY JURISDICTION ZONE OF THE RESOURCE TO DETERMINE ALLOWED SECRETS DATA WITH RESPECT TO THE DATA SECURITY JURISDICTION ZONE OF THE RESOURCE OPERATION 513, allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 515.

As noted above, the secrets represented by the allowed secrets data, are provided by, and/or originate from, different secret sources. In one embodiment, the secrets data representing the different classes of secrets are maintained, at least initially, in separate secret databases, systems, or data stores, and/or in a master secrets database.

As noted above, in one embodiment, allowed secrets data is obtained, and/or maintained, at least initially, by a secrets manager system, and/or from a master secrets database, that is associated with a data/resources services center, such as a data center, providing data and/or resources to distributed computing systems, such as cloud-based computing environments and resources. Consequently, in one embodiment, the allowed secrets data controlled and/or accessed by secrets manager system includes data representing one or more types of allowed secrets data used to control access to one or more types of resources associated with the types of allowed secrets data by one or more entities, such as a virtual asset, residing physically or logically outside the data/resources services center where the secrets data is maintained, and/or accessed.

As noted above, in various embodiments, the data security policy data for the identified data security jurisdiction zones includes data indicating allowed encryption levels within the identified data security jurisdiction zones. Consequently, in various embodiments, the secrets request data represents a request for encryption key data to be transferred to the resource and the allowed secrets data is allowed encryption key data including at least one encryption key in compliance with the data security policy data for the data security jurisdiction zone of the resource.

In various embodiments, examples of encryption keys represented in the allowed secrets data include, but are not limited to, one or more of, a public encryption key; a private encryption key; a symmetric encryption key; an asymmetric encryption key; a public pre-placed encryption key; a private pre-placed encryption key; a 40-bit encryption key; any length encryption key; an authentication encryption key; a benign encryption key; a content-encryption key (CEK); a cryptovariable encryption key; a derived encryption key; an electronic encryption key; an ephemeral encryption key; a key encryption key (KEK); a key production encryption key (KPK); a FIREFLY encryption key; a master encryption key; a message encryption key (MEK); a RED encryption key; a session encryption key; a traffic encryption key (TEK); a transmission security encryption key (TSK); a seed encryption key; a signature encryption key; a stream encryption key; a Type 1 encryption key; a Type 2 encryption key; a Vernam encryption key; a zeroized encryption key; and/or any encryption key, as discussed herein, and/or as known in the art at the time of filing, and/or as developed after the time of filing.

In one embodiment, once allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 515, process flow proceeds AUTOMATICALLY PROVIDE THE ALLOWED SECRETS DATA TO THE RESOURCE OPERATION 517.

In one embodiment, once the allowed secrets data with respect to the data security jurisdiction zone of the resource representing one or more allowed secrets is obtained/collected at AUTOMATICALLY OBTAIN ALLOWED SECRETS DATA WITH RESPECT TO THE DATA SECURITY JURISDICTION ZONE OF THE RESOURCE OPERATION 515, the allowed secrets data with respect to the data security jurisdiction zone of the resource is provided to the resource at AUTOMATICALLY PROVIDE THE ALLOWED SECRETS DATA TO THE RESOURCE OPERATION 517.

In one embodiment, at AUTOMATICALLY PROVIDE THE ALLOWED SECRETS DATA TO THE RESOURCE OPERATION 517 the allowed secrets data with respect to the data security jurisdiction zone of the resource is provided to the resource by automatically transferring the allowed secrets data to a secrets data store in the data security jurisdiction zone of the resource accessible by the resource.

In one embodiment, once the allowed secrets data with respect to the data security jurisdiction zone of the resource is provided to the resource at AUTOMATICALLY PROVIDE THE ALLOWED SECRETS DATA TO THE RESOURCE OPERATION 517, process flow proceeds to EXIT OPERATION 530.

In one embodiment, at EXIT OPERATION 530 process 500 for automatically managing secrets in multiple data security jurisdiction zones is exited to await new data.

Using process 500 for managing secrets of tenants in a multi-tenant computing environment, data security policies associated with various data security jurisdiction zones is obtained. Then when a request for secrets data is received from a resource, the data security jurisdiction zone of the resource is automatically determined and the data security policy data for the data security jurisdiction zone of the resource is automatically obtained/retrieved and analyzed to determine allowed secrets data for the resource.

Consequently, using process 500 for managing secrets of tenants in a multi-tenant computing environment, appropriate/allowed secrets for resources in different data security jurisdiction zones is automatically provided in an efficient and effective manner.

As noted above, the specific illustrative examples discussed above are but illustrative examples of implementations of embodiments of the method or process for providing rotating-key encrypted databases. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for managing secrets of tenants of a multi-tenant computing environment, comprising:
    identifying one or more data security jurisdiction zones containing one or more multi-tenant assets to which secrets policies of the tenants are to be applied;
    maintaining, by a service provider computing system, service provider secrets policy data representing one or more data security policies associated with one or more cloud computing environments for the identified one or more data security jurisdiction zones and security requirements associated with the secrets of the tenants within the multi-tenant computing environment;
    receiving, by the service provider computing system from a first tenant computing system, first tenant secrets policy data representing a first tenant secrets policy of a first tenant of the multi-tenant computing environment and including data indicating secrets of the first tenant secrets policy;
    receiving a request from the first tenant computing system to apply the first tenant secrets policy data to a first multi-tenant asset of the multi-tenant computing environment;
    in response to receiving the request, comparing the first tenant secrets policy data with the service provider secrets policy data to determine whether the secrets of the first tenant secrets policy are in compliance with the security requirements of the service provider secrets policy data;

further in response to receiving the request, comparing the service provider secrets policy data with the first tenant secrets policy to determine whether the first tenant secrets policy is at least as restrictive as the service provider secrets policy data and further determining whether secrets sharing is allowed between the first tenant and the first multi-tenant asset;

responsive to determining the secrets of the first tenant secrets policy are in compliance with the security requirements of the service provider secrets policy data and responsive to determining the first tenant secrets policy is at least as restrictive as the service provider secrets policy data, and responsive to determining secrets sharing is allowed between the first tenant and the first multi-tenant asset, authorizing, with the service provider computing system, the request from the first tenant computing system to apply the first tenant secrets policy data to the first multi-tenant asset;

responsive to determining the secrets of the first tenant secrets policy are not in compliance with the security requirements of the service provider secrets policy data, or responsive to determining the first tenant secrets policy is not at least as restrictive as the service provider secrets policy data, or responsive to determining secrets sharing is not allowed between the first tenant and the first multi-tenant asset, rejecting the request to apply the first tenant secrets policy data to the first multi-tenant asset; and applying the first tenant secrets policy data to the first multi-tenant asset responsive to determining the request from the first tenant computing system is authorized.

2. The method of claim 1 further comprising:
receiving, by the service provider computing system, a second tenant secrets policy from a second tenant computing system for a second tenant of the multi-tenant computing environment.

3. The method of claim 2 wherein the receiving the first tenant secrets policy data includes receiving first tenant secrets,
wherein the receiving the second tenant secrets policy includes receiving second tenant secrets, the method further comprising:
maintaining a first log of one or more of use, copying, deletion, receipt, transfer, transmission, backup, and restoration of the first tenant secrets;
maintaining a second log of one or more of use, copying, deletion, receipt, transfer, transmission, backup, and restoration of the second tenant secrets;
providing the first log to the first tenant computing system, in response to receiving a request for the first log from the first tenant computing system; and
providing the second log to the second tenant computing system, in response to receiving a request for the second log from the second tenant computing system.

4. The method of claim 2, further comprising:
maintaining a cross-tenant policy,
wherein the cross-tenant policy includes rules and exceptions for enabling the first multi-tenant asset to concurrently use first tenant secrets and second tenant secrets to decrypt encrypted user data,
wherein the first multi-tenant asset is shared by the first tenant and the second tenant.

5. The method of claim 2 wherein the first tenant secrets policy includes rules for applying first tenant secrets and the second tenant secrets policy includes rules for applying second tenant secrets, wherein the first tenant secrets and the second tenant secrets include encryption keys,
wherein the security requirements of the service provider secrets policy data include a minimum frequency by which the encryption keys are required to be rotated responsive to determining some of the encryption keys are applied by either the first tenant or the second tenant to data stored by the first multi-tenant asset in the multi-tenant computing environment.

6. The method of claim 2 wherein the request is a first request, the method further comprising:
receiving a second request from the second tenant computing system to apply the second tenant secrets policy to the first multi-tenant asset in the multi-tenant computing environment;
in response to receiving the second request, comparing the second tenant secrets policy with the security requirements of the service provider secrets policy data; and
responsive to determining the second tenant secrets policy satisfies the security requirements of the service provider secrets policy data, authorizing the second request and applying the second tenant secrets policy to the first multi-tenant asset.

7. The method of claim 2 wherein the first multi-tenant asset includes:
an application shared by the first tenant and the second tenant;
a server computing system shared by the first tenant and the second tenant; and
a non-volatile memory device shared by the first tenant and the second tenant.

8. The method of claim 1 wherein the applying the first tenant secrets policy data includes applying, by the service provider computing system, the first tenant secrets policy data to the first multi-tenant asset.

9. The method of claim 1 wherein the applying the first tenant secrets policy data includes applying, by the first tenant computing system, the first tenant secrets policy data to the first multi-tenant asset.

10. The method of claim 1 wherein at least one of the identified one or more data security jurisdiction zones are selected from group of data security jurisdiction zones consisting of:
a geographic region data security jurisdiction zone;
a political region data security jurisdiction zone;
a security based data security jurisdiction zone;
a computing environment data security jurisdiction zone; and
a computing sub-environment data security jurisdiction zone within a computing environment data security jurisdiction zone.

11. The method of claim 1 wherein the one or more data security policies for the identified one or more data security jurisdiction zones include data indicating allowed encryption levels within the identified one or more data security jurisdiction zones.

12. The method of claim 1 wherein the one or more data security policies for the identified one or more data security jurisdiction zones include allowed encryption key data including at least one encryption key in compliance with the one or more data security policies for the identified one or more data security jurisdiction zones.

13. The method of claim 1 wherein the first multi-tenant asset is selected from a group of multi-tenant assets consisting of:
- a virtual machine;
- a virtual server;
- a database or data store;
- an instance in a cloud environment;
- a cloud environment access system;
- part of a mobile device;
- part of a remote sensor;
- part of a laptop computing system;
- part of a desktop computing system;
- part of a point-of-sale computing system;
- part of an ATM; and
- part of an electronic voting machine computing system.

14. The method of claim 1 wherein the one or more data security policies for the identified one or more data security jurisdiction zones are updated automatically.

15. The method of claim 1 wherein the applying the first tenant secrets policy data includes providing the secrets of the first tenant secrets policy to the first multi-tenant asset.

16. A method for managing secrets of customers of a service provider for a multi-tenant computing environment, comprising:
- identifying one or more data security jurisdiction zones containing one or more multi-tenant assets to which secrets policies of the customers are to be applied;
- maintaining, by a service provider computing system, a service provider security policy that includes one or more data secrets policies associated with one or more cloud computing environments for the identified one or more data security jurisdiction zones and security requirements for the customers of a first multi-tenant asset,
  - wherein the first multi-tenant asset is hosted for the customers by the service provider,
  - further wherein the first multi-tenant asset includes at least one of:
    - an application shared by the customers;
    - a server computing system shared by the customers;
    - a virtual machine; and
    - non-volatile memory device logically divided between at least two of the customers;
- receiving a request from a first one of the customers to apply a first customer security policy to a first part of the first multi-tenant asset allocated to the first one of the customers,
  - wherein the first customer security policy includes rules for managing first customer secrets with the first multi-tenant asset in the multi-tenant computing environment and secrets of the first customer security policy;
- comparing the first customer security policy associated with the request to the service provider security policy to determine whether the secrets of the first customer security policy are in compliance with the security requirements of the service provider security policy and further determining whether secrets sharing is allowed between the first one of the customers and the first part of the first multi-tenant asset; and
- responsive to determining the first customer security policy is at least as restrictive as the service provider security policy and responsive to determining secrets sharing is allowed between the first one of the customers and the first part of the first multi-tenant asset, authorizing the request to enable the first one of the customers to apply the first customer security policy to the first part of the first multi-tenant asset allocated to the first one of the customers.

17. The method of claim 16, further comprising:
- receiving, by the service provider computing system, a second request from a second one of the customers for access to the first customer secrets to enable the second one of the customers to execute an operation associated with the first multi-tenant asset;
- accessing a cross-tenant security policy maintained by the service provider computing system to determine access rights of the second one of the customers to the first customer secrets; and
- authorizing the second request responsive to determining the cross-tenant security policy includes access rights for the second one of the customers to the first customer secrets for the operation associated with the first multi-tenant asset.

18. The method of claim 16 wherein the first customer secrets include one or more passwords, encryption keys, and digital certificates that are required to access data of the first one of the customers within the first multi-tenant asset.

19. The method of claim 16, further comprising:
- receiving, by the first multi-tenant asset, the first customer secrets and second customer secrets;
- managing, with the service provider computing system, the first customer secrets and the second customer secrets received by the first multi-tenant asset;
- recording a first log associated with managing the first customer secrets and a second log associated with managing the second customer secrets; and
- providing the first log to the first one of the customers and the second log to the second one of the customers.

20. The method of claim 19, wherein the providing the first log and the second log includes hosting a user interface for viewing and retrieving the first log and the second log.

21. A system for managing secrets of tenants of a multi-tenant computing environment, the system comprising:
- one or more processors; and
- at least one memory coupled to the one or more processors, the at least one memory having stored therein instructions which when executed by any set of the one or more processors, perform operations for managing the secrets of the tenants of the multi-tenant computing environment, the operations including:
  - identifying one or more data security jurisdiction zones containing one or more multi-tenant assets to which secrets policies of the tenants are to be applied;
  - maintaining, by a service provider computing system, service provider secrets policy data representing one or more data security policies associated with one or more cloud computing environments for the identified one or more data security jurisdiction zones and security requirements associated with the secrets of the tenants within the multi-tenant computing environment;
  - receiving, by the service provider computing system from a first tenant computing system, first tenant secrets policy data representing a first tenant secrets policy of a first tenant of the multi-tenant computing environment and including data indicating secrets of the first tenant secrets policy;
  - receiving a request from the first tenant computing system to apply the first tenant secrets policy data to a first multi-tenant asset of a second tenant of the multi-tenant computing environment;
  - in response to receiving the request, comparing the first tenant secrets policy data with the service provider secrets policy data to determine whether the secrets of the first tenant secrets policy are in compliance with the security requirements of the service provider secrets policy data;

further in response to receiving the request, comparing the service provider secrets policy data with the first tenant secrets policy to determine whether the first tenant secrets policy is at least as restrictive as the service provider secrets policy data and further determining whether secrets sharing is allowed between the first tenant and the first multi-tenant asset;

responsive to determining the secrets of the first tenant secrets policy are in compliance with the security requirements of the service provider secrets policy data and responsive to determining the first tenant secrets policy is at least as restrictive as the service provider secrets policy data, and responsive to determining secrets sharing is allowed between the first tenant and the first multi-tenant asset, authorizing, with the service provider computing system, the request from the first tenant computing system to apply the first tenant secrets policy data to the first multi-tenant asset;

responsive to determining the secrets of the first tenant secrets policy are not in compliance with the security requirements of the service provider secrets policy data, or responsive to determining the first tenant secrets policy is not at least as restrictive as the service provider secrets policy data, or responsive to determining secrets sharing is not allowed between the first tenant and the first multi-tenant asset, rejecting the request to apply the first tenant secrets policy data to the first multi-tenant asset; and applying the first tenant secrets policy data to the first multi-tenant asset responsive to determining the request from the first tenant computing system is authorized.

22. The system of claim 21 further comprising:
receiving, by the service provider computing system, a second tenant secrets policy from a second tenant computing system for the second tenant of the multi-tenant computing environment.

23. The system of claim 22 wherein the receiving the first tenant secrets policy data includes receiving first tenant secrets,
wherein the receiving the second tenant secrets policy includes receiving second tenant secrets, the operations further comprising:
maintaining a first log of one or more of use, copying, deletion, receipt, transfer, transmission, backup, and restoration of the first tenant secrets;
maintaining a second log of one or more of use, copying, deletion, receipt, transfer, transmission, backup, and restoration of the second tenant secrets;
providing the first log to the first tenant computing system, in response to receiving a request for the first log from the first tenant computing system; and
providing the second log to the second tenant computing system, in response to receiving a request for the second log from the second tenant computing system.

24. The system of claim 22 wherein the operations further comprise:
maintaining a cross-tenant service policy that includes rules associated with sharing first tenant secrets with the second tenant computing system, and associated with sharing second tenant secrets with the first tenant computing system.

25. The system of claim 22 wherein the operations further comprise:
maintaining a cross-tenant policy,
wherein the cross-tenant policy includes rules and exceptions for enabling the first multi-tenant asset to concurrently use first tenant secrets and second tenant secrets to decrypt encrypted user data,
wherein the first multi-tenant asset is shared by the first tenant and the second tenant.

26. The system of claim 22 wherein the first tenant secrets policy includes rules for applying first tenant secrets and the second tenant secrets policy includes rules for applying second tenant secrets, wherein the first tenant secrets and the second tenant secrets include encryption keys,
wherein the security requirements of the service provider secrets policy data include a minimum frequency by which the encryption keys are required to be rotated responsive to determining some of the encryption keys are applied by either the first tenant or the second tenant to data stored by the first multi-tenant asset in the multi-tenant computing environment.

27. The system of claim 22 wherein the request is a first request, the operations further comprising:
receiving a second request from the second tenant computing system to apply the second tenant secrets policy to the first multi-tenant asset in the multi-tenant computing environment;
in response to receiving the second request, comparing the second tenant secrets policy with the security requirements of the service provider secrets policy data; and
responsive to determining the second tenant secrets policy satisfies the security requirements of the service provider secrets policy data, authorizing the second request and applying the second tenant secrets policy to the first multi-tenant asset.

28. The system of claim 22 wherein the first multi-tenant asset includes at least one of:
an application shared by the first tenant and the second tenant;
a server computing system shared by the first tenant and the second tenant; and
non-volatile memory device shared by the first tenant and the second tenant.

29. The system of claim 21 wherein the applying the first tenant secrets policy data includes applying, by the service provider computing system, the first tenant secrets policy data to the first multi-tenant asset.

30. The system of claim 21 wherein the applying the first tenant secrets policy data includes applying, by the first tenant computing system, the first tenant secrets policy data to the first multi-tenant asset.

31. A system for managing secrets of customers of a service provider for a multi-tenant computing environment, comprising:
one or more processors; and
at least one memory coupled to the one or more processors, the at least one memory having stored therein instructions which when executed by any set of the one or more processors, perform operations for managing the secrets of the customers of the service provider for the multi-tenant computing environment, the operations including:
identifying one or more data security jurisdiction zones containing one or more multi-tenant assets to which secrets policies of the customers are to be applied;

maintaining, by a service provider computing system, a service provider security policy that includes one or more data security policies associated with one or more cloud computing environments for the identified one or more data security jurisdiction zones and security requirements for the customers of a first multi-tenant asset,
  wherein the first multi-tenant asset is hosted for the customers by the service provider,
  wherein the first multi-tenant asset includes at least one of:
    an application shared by the customers;
    a server computing system shared by the customers;
    a virtual machine; and
    non-volatile memory device logically divided between at least two of the customers;
receiving a request from a first one of the customers to apply a first customer security policy to a first part of the first multi-tenant asset allocated to the first one of the customers,
  wherein the first customer security policy includes rules for managing first customer secrets with the first multi-tenant asset in the multi-tenant computing environment and secrets of the first customer security policy;
comparing the first customer security policy associated with the request to the service provider security policy to determine whether the secrets of the first customer security policy are in compliance with the security requirements of the service provider security policy and further determining whether secrets sharing is allowed between the first one of the customers and the first part of the first multi-tenant asset; and
responsive to determining the first customer security policy is at least as restrictive as the service provider security policy, authorizing the request to enable the first one of the customers to apply the first customer security policy to the first part of the first multi-tenant asset allocated to the first one of the customers.

32. The system of claim 31 wherein the operations further comprise:
  receiving, by the service provider computing system, a second request from a second one of the customers for access to the first customer secrets to enable the second one of the customers to execute an operation associated with the first multi-tenant asset;
  accessing a cross-tenant security policy maintained by the service provider computing system to determine access rights of the second one of the customers to the first customer secrets; and
  authorizing the second request responsive to determining the cross-tenant security policy includes access rights for the second one of the customers to the first customer secrets for the operation associated with the first multi-tenant asset.

33. The system of claim 31 wherein the first customer secrets include one or more passwords, encryption keys, and digital certificates that are required to access data of the first one of the customers within the first multi-tenant asset.

34. The system of claim 31 wherein the operations further comprise:
  receiving, by the first multi-tenant asset, the first customer secrets and second customer secrets;
  managing, with the service provider computing system, the first customer secrets and the second customer secrets received by the first multi-tenant asset;
  recording a first log associated with managing the first customer secrets and a second log associated with managing the second customer secrets; and
  providing the first log to the first one of the customers and the second log to the second one of the customers.

35. The system of claim 34, wherein the providing the first log and the second log includes hosting a user interface for viewing and retrieving the first log and the second log.

\* \* \* \* \*